United States Patent [19]

Ishigaki et al.

[11] Patent Number: 4,977,578

[45] Date of Patent: Dec. 11, 1990

[54] SPREAD SPECTRUM COMMUNICATION SYSTEM

[75] Inventors: Yukinobu Ishigaki, Machida; Kenichi Mizuno, Yokohama, both of Japan

[73] Assignee: Victor Company of Japan, Ltd., Yokohama, Japan

[21] Appl. No.: 313,259

[22] Filed: Feb. 21, 1989

[30] Foreign Application Priority Data

| | | | |
|---|---|---|---|
| Feb. 19, 1988 | [JP] | Japan | 63-37707 |
| Feb. 19, 1988 | [JP] | Japan | 63-37708 |
| Feb. 19, 1988 | [JP] | Japan | 63-37709 |
| Feb. 22, 1988 | [JP] | Japan | 63-37629 |
| Mar. 2, 1988 | [JP] | Japan | 63-49245 |
| Mar. 16, 1988 | [JP] | Japan | 63-34897[U] |

[51] Int. Cl.[5] .......... H04K 1/00

[52] U.S. Cl. .......... 375/1

[58] Field of Search .......... 375/1

[56] References Cited

U.S. PATENT DOCUMENTS

| | | | |
|---|---|---|---|
| 4,217,586 | 8/1980 | McGuffin | 375/1 |
| 4,309,769 | 1/1982 | Taylor | 375/1 |
| 4,701,434 | 10/1987 | Jasper | 375/1 |
| 4,785,463 | 11/1988 | Jane et al. | 375/1 |

*Primary Examiner*—Salvatore Cangialosi

*Attorney, Agent, or Firm*—Fleit, Jacobson, Cohn, Price, Holman & Stern

[57] ABSTRACT

A spread spectrum communication system having a modulation unit for modulating and spreading an information signal by one or more of carrier signals and a spread code and transmitting it as a radio wave, and a demodulation unit for despreading and demodulating a received radio wave to pick up the information signal. The modulation unit includes a synthesizing and modulating unit for synthesizing a first primary modulated signal obtained by modulating a first carrier by the information signal and a second primary modulation signal obtained by modulating a second carrier, and a spectrum spreading unit for spreading the synthesized first and second primary modulation signals with a spread code to generate a spread spectrum signal containing first and second spread signal components. The demodulation unit includes a separation unit for separating a received spread spectrum signal into the first and second spread signals, a spread signal reproduction unit for reproducing the spread code on the separated first and second spread signal component, and a despreading unit for despreading the separated first spread signal component and reproduced spread code to reproduce the information signal.

23 Claims, 17 Drawing Sheets

SPREAD SPECTRUM COMMUNICATION SYSTEM

BACKGROUND OF THE INVENTION

The present invention relates to a spread spectrum (SS) communication system, and more particularly, to a spread spectrum communication system wherein pseudo noise codes to be used in despreading received signals at a receiving (demodulating) side, are generated using a circuit of relatively simple arrangement, thus dispensing with a spread code generator at the receiving side.

Communication techniques in Japan have recently undergone remarkable development with a variety of system techniques. Multiplex operation, typically in optical communication techniques is one such development. A main trend in radios communication techniques is multi channel access (MCA) for effective utilization of analog modulated radios. Although the MCA system is advantageous in that a specific channel is not occupied long time by one user, the number of channels is limited and hence the number of communications which can be performed at the same time does not exceed it. Therefore, a user in large cities where channels are busy, is often urged to wait for his or her turn. The MCA system uses a limited frequency domain by dividing only its bandwidth. It is considered that such a system nowadays stands to loose the requirements of current information fidelity and instantaneousness.

More efficient communication systems have been studied and developed by many researchers. One of them is a spread spectrum communication system developed about fifty years ago. The fundamental concept thereof was established in the nineteen fifties. In the nineteen sixties, a pseudo noise code generator made of as many transistors as one hundred had been used. However, the active elements thereof and the manufacturing methods at that time were not still mature, and it has long been desired to improve them. With recent developments for high density IC techniques and low-cost ICs, more compact and inexpensive devices have become available so that the spread spectrum communication system has been receiving attention once again.

According to the spread spectrum communication system, a carrier is primary modulated by an information signal, and the primary modulated carrier is secondary modulated by wide band noise-like spread codes to spread it over a very wide bandwidth. The spread spectrum communication system generally includes a direct spread (DS) system, frequency hopping (FH) system, hybrid system and the like, depending upon the secondary modulation scheme. The present invention concerns the DS system for this. The spread spectrum communication system has a number of advantages as in the following:

1. High security and privacy;
2. Strong resistance against external interference and noise, and against intentional disturbance;
3. Compatibility with conventional systems;
4. No control station and control channel as in an MCA station;
5. Capability of supervising by using address codes;
6. Seemingly no radio because of low power density of the DS system (Capability of transmitting radio with thinly spread power);

7. Capability of increasing the number of stations in trade for a slight degradation of speech quality; and
8. Capability of multiplex operation at a same frequency band by changing pseudo noise codes.

Taking the above advantages into consideration, the spread spectrum communication system is now widely applied to not only communication fields but also to various other fields such as consumer apparatus.

With the above-described technical background kept in mind, the fundamental principle of spread spectrum communication and conventional spread spectrum communication will be described next.

Referring to FIG. 1 showing the basic structure of a conventional spread spectrum communication system, a station A generally indicated by numeral 1 at the transmission side has a primary modulator 2 for receiving a carrier and an information signal and performing primary modulation, a spread code generator 3 for generating spread codes to be used for spread modulation of the primary modulated signal F1, a spread modulator 4 for receiving the primary modulated signal F1 and a spread code signal Fn and performing secondary modulation, and an antenna A1 of the A station 1. In FIG. 1, the signal Fn represents a radio wave transmitted from an ordinary station which becomes an interference station to the transmission side A station 1 and a receiving side B station 5.

The receiving side B station 5 has a spread code generator 6 for generating spread codes to be used for despreading a received signal, a despreading circuit 7 for despreading the received signal from an antenna A2 in accordance with the spread codes, a filter 8 for passing the frequency components of preferably a specific narrow band of an output from the despreading circuit 7, and a demodulator 9 for demodulating an output from the filter 8.

Next, the function of a conventional spread spectrum communication system will be described with reference to the frequency spectrums shown in FIG. 2 at each circuit portion of FIG. 1.

The primary modulation signal F1, as shown in FIG. 2(*a*), which was primarily modulated at the primary modulator 2 at the transmission side A station 1, is secondarily modulated at the spread modulator 4 by the spread code signal Fss (refer to FIG. 2(*b*)) from the spread code generator 3 and amplified to be output from the antenna A1 as the transmitted signal F1s. The type of primary modulations is not particularly limited, but frequency modulation (FM), phase shift keying (PSK) and the like may be adopted (in this specification, the description is assumed to use PSK modulation). For the secondary modulation (spread modulation), PSK modulation is generally performed using pseudo noises (hereinafter called PN code). It is required for the PN code to be like a random noise as much as possible, and to have a predetermined period for picking up the code at the receiving side.

Next, the function of the receiving side will be described. At the receiving side B station 5, the transmitted signal F1s obtained from the antenna A2 via a filter and high frequency amplifier (not shown) is despread at the despread circuit 7 using a despread code from the despread code generator 6. The despread code generator 6 is in synchronization with the spread code generator 3 of the A station, and the same PN code (Fss) is used. Radio waves incoming to the antenna A2 include not only an F1s radio wave but also F2s, F3s, . . . , radio waves from other SS stations, and radio waves Fn from general stations other than SS stations, as shown in FIG. 2(c). The spectrum shown in FIG. 2(a) is restored from the radio wave F1s being dealt with, and shown in FIG. 2(d), at the filter components other than F1s (refer to FIG. 2(e)). Then, original information is demodulated at the demodulator 9. As seen from FIG. 2(e), the output signal from the filter 8 includes not only F1s but also interference radio waves Fn and a fraction of SS radio waves from other SS stations. The ratio of the object signal power to the residual power is called the DN ratio (a ratio of desired signal power to interference power). In order to obtain a larger DN ratio, the spread bandwidth should advantageously be as wide as possible. The spread bandwidth is generally set at 100 to 1000 times as wide as the frequency bandwidth of an information signal or the primarily modulated signal.

The basic principle of the spread spectrum communication has been described before. Next, the particular operation will be theoretically described for primary and secondary modulation and demodulation during the spread spectrum communication. A spread spectrum signal S(t) (F1s shown in FIG. 1) for the spread spectrum communication is given by the following equation, taking the information data as d(t) [+1 or −1], the spread code Fss as P(t) [+1 or −1], and the carrier as $\cos\omega_c t$:

$$S(t)=d(t)P(t)\cos\omega_c t \quad (1)$$

(where $\omega_c=2\pi fc$)
At the receiving side, the incoming spread spectrum signal S(t) is transformed into a two-phase PSK signal $d(t)\cos\omega_c t$ by multiplying (or correlating, despreading) it by the spread code P(t). The spread code P(t) (actually $\hat{P}(t)$ with slight delay is obtained, in synchronization with the spread code associated with the spread spectrum signal at the time of transmission, by using a spread code clock derived from the incoming spread spectrum signal. The obtained two-phase PSK signal is multiplied by the reproduced $\widehat{\cos\omega_c t}$ (actually $\cos\omega_c t$ with slight delay) for synchronous detection to obtain:

$$d(t)(\cos\omega_c t)^2=d(t)(1+\cos 2\omega_c t)/2$$

After removing the double carrier component $2\omega_c t$ by the filter, the information data d(t) are demodulated.

The process gain Gp of the spread spectrum communication is given by:

$$Gp=Bp/B_D \quad (2)$$

where $B_D$ is the bandwidth (main lobe of the spectrums) of the two-phase PSK signal $d(t)\cos\omega_c t$, and Bp is the band width (main lobe of the spectrums) of the spread spectrum signal spread by the spread code P(t). The process gain Gp is several hundreds to several thousands for the case of an ordinary design. Suppression of interference signals, noises and the like depends upon the process gain. Thus, the wider the frequency bandwidth of the spread spectrum signal is set with respect to the information data d(t), the interference signals, noises and the like can be suppressed to the larger extent. Such improvement therefore depends substantially and exclusively upon the process gain Gp.

In the spread spectrum communication system, "despreading" at the receiving side is most important. However, it is difficult to generate a reliable spread code required in performing such despreading. Despreading methods presently adopted in general include a despreading method using an AFC loop, delay locked loop and multiplier, and a despreading method using a synchronous loop of matched filter and multiplier.

However, the above-described conventional despreading methods for a spread spectrum communication system pose the problem of having a complicated circuit arrangement, problems associated with circuit adjustment, and cost effectiveness. These problems must be solved for allowing various applications to consumer apparatus.

Furthermore, a conventional communication system requires a very wide frequency band so that it poses a problem associated with the effective utilization of the frequency band (radio waves). The allowable frequency band is limited in practical use so that it is difficult to design the communication system as desired.

SUMMARY OF THE INVENTION

The present invention has been made to solve the above problems and to provide the spread spectrum communication system which achieves the following objects.

A first object of the present invention is to provide a communication system capable of allowing various applications to consumer apparatus very easily because the circuit arrangement can be simplified without the necessity of a clock reproducing circuit, spread code generator, a looped synchronous pull-in circuit, synchro holding circuit and the like which are essential circuit elements for the conventional system, and the cost can be considerably reduced.

A second object of the present invention is to provide a spread spectrum communication system capable of stabilizing the signal transmission/reception operation without requiring time for synchronous pull-in and without missing synchronism even under the condition of the synchronous pull-in circuit, synchro holding circuit and the like not being necessary.

A third object of the present invention is to provide a communication system capable of allowing more precise communication by obtaining a demodulated two-phase PSK signal having the same angular frequency as that of the modulated two-phase PSK signal at a carrier reproduction circuit.

To achieve the above objects, the spread spectrum communication system of this invention having a modulation unit for transmitting a radio wave and a demodulation unit for receiving the radio wave and picking up an information signal, is constructed so that the modulation unit comprises synthesizing/modulating means for synthesizing a primary modulated signal obtained by modulating the first carrier by an information signal, and the second carrier, and spectrum spreading means for generating first and second spread signals by spectrum spreading said synthesized signal on the basis of a spread code signal output from spread code generating means; and the demodulation units comprises separation means for separating an input spread spectrum signal into the first spread spectrum signal which is the information signal multiplied by the first carrier and the second spread spectrum signal which is the information signal multiplied by the second carrier, spread code reproducing means for reproducing a spread signal on the basis of the first and second spread spectrum signals separately detected, and despreading means for despreading the first spread spectrum signal based on the reproduced spread signal.

The particular circuit arrangements of spectrum spreading means for generating the first and second spread spectrum signals at the modulation unit, and of despreading means of the demodulation unit, have the following various aspects in accordance with the embodiments to be later described.

According to the first aspect of the communication system, the modulation unit comprises means for obtaining an addition signal of a second carrier and a primary modulated signal of two-phase PSK signal which is obtained by modulating the first carrier by an information signal, and means for obtaining a spread spectrum signal by spreading the obtained addition signal with a spread code signal. The demodulation unit comprises means for receiving the spread spectrum signal and separately detecting said spread spectrum signal into a spread code signal which is the information signal multiplied by the first carrier and into a spread code signal which is the information signal multiplied by the second carrier, means for generating two two-phase PSK signals by multiplying together both the separately detected spread signals for despreading, and means for output of only one of the two two-phase PSK signals.

According to the second aspect of the communication system, the modulation unit comprises means for obtaining a PSK modulated signal by PSK modulating the first carrier by an information signal, means for receiving a clock signal and obtaining a spread code signal, means for obtaining the first spread spectrum signal by multiplying the PSK modulated signal by the spread code signal for spreading, means for receiving the spread code signal and the clock signal and obtaining a finite sum conversion output signal, means for obtaining the second spread spectrum signal by multiplying the obtained finite sum conversion output signal by the second carrier, and means for output of an addition spread pectrum signal by adding together the first and second spread spectrum signals. The demodulation unit comprises means for receiving the addition spread spectrum signal and separately detecting the addition spread spectrum signal into the first and second spread spectrum signals, a delay circuit for receiving the separately detected second spread spectrum signal and giving it a one slot time delay, means for receiving and multiplying together an output from the delay circuit and the second spread spectrum signal to obtain a demodulated spread code signal, and means for receiving and multiplying together the obtained demodulated spread code signal and the first spread spectrum signal for despreading the first spread spectrum signal to output a demodulated PSK signal.

According to the third aspect of the communication system, the modulation unit comprises, means for receiving and multiplying together an information signal and the first carrier to generate a two-phase PSK signal as a primary modulated signal, means for receiving the two-phase PSK signal and the second carrier to obtain an addition two-phase PSK signal, means for receiving a clock signal and generating a spread code signal on the basis of the clock signal, and means for receiving and multiplying together the addition two-phase PSK signal and the spread code signal for spreading to obtain a spread spectrum signal. The demodulation unit comprises means for receiving the spread spectrum signal and separating the spread spectrum signal into the first and second spread signals having different spectrum components corresponding to the first and second carriers, means for multiplying together the separated first and second spread signals to obtain a multiplication output signal, means for separating the obtained multiplication output signal into two signals corresponding to the difference frequency between and the sum frequency of the first and second carriers and multiplying together the two signals to obtain two squared output signals corresponding to the frequencies twice as high as that of the first and second carriers, means for separating the two squared output signals and frequency-dividing the two separated squared output signals to obtain first and second reproduced carriers, means for receiving and multiplying together the second reproduced carrier and the second spread signal to generate a reproduced spread code signal, means for receiving and multiplying together the reproduced spread code signal and the first reproduced carrier to generate a despreading signal, and means for receiving and multiplying together the despreading signal and the first spread signal for despreading to demodulate the primary demodulated signal and output the information signal.

According to the fourth aspect of the communication system, the modulation unit comprises means for receiving and multiplying together an information signal and the first carrier to generate a first two-phase PSK signal, means for receiving the information signal and a second carrier to obtain the second PSK signal, means for receiving a clock signal and generating a spread code signal on the basis of the clock signal, means for receiving and multiplying together the first two-phase PSK signal and the spread code signal for spreading to obtain the first spread signal, means for receiving and multiplying together the second two-phase PSK signal and the spread code signal for spreading to obtain the second spread signal, means for generating a control signal in synchronization with the spread code signal on the basis of the clock signal, means for receiving and multiplying together the control signal and the second spread signal to obtain a multiplication output signal, and means for adding the multiplication output signal and the first spread signal to generate and output a spread spectrum signal. The demodulation unit comprises means for receiving the spread spectrum signal and separating the spread spectrum signal into the first spread signal and the multiplication output signal having different spectrum components corresponding to the first and second carriers, means for receiving and processing the separated first spread signal and multiplication output signal to derive therefrom a control signal, means for reproducing a clock signal and a reset signal on the basis of the control signal and generating a spread code signal in synchronization with the spread code signal at the modulation side, means for receiving and multiplying together the reproduced spread code signal and the separately detected first spread signal for despreading to obtain a demodulated two-phase PSK signal, and means for demodulation and output of an information signal equivalent to the information signal at the time of modulating through synchronous detection of the demodulated two-phase PSK signal.

According to the fifth aspect of the communication system, the modulation unit comprises means for receiving and multiplying together an information signal and the first carrier to generate a two-phase PSK signal, means for receiving a clock signal and generating a spread code signal on the basis of the clock signal, means for receiving and frequency-dividing the clock signal to generate a control signal which is in synchro with the spread code signal, means for receiving and multiplying together the control signal and the second carrier to obtain a modulated signal, and means for multiplying an addition signal obtained through the addition of the modulated signal and the two-phase PSK signal for spreading to generate and output a spread spectrum signal. The demodulation unit comprises means for receiving the spread spectrum signal and separating the spread spectrum signal into a signal component which is a multiplication of the two-phase PSK signal and the spread code signal and a signal component which is a multiplication of the modulated signal and the spread code signal, means for receiving and processing the separated signal component which is the multiplication of the modulated signal and the spread code signal to separate and reproduce the control signal, means for reproducing the clock signal on the basis of the reproduced control signal to generate a spread code signal in synchronization with the spread code signal at the modulating side, means for receiving and multiplying together the reproduced spread code signal and the separated signal component which is the multiplication of the two-phase PSK signal and the spread code signal for despreading to obtain a demodulated two-phase PSK signal, and means for demodulation and output of an information signal equivalent to the information signal at the time of modulating through synchronous detection of the demodulated two-phase PSK signal.

According to the last aspect of the communication system, the modulation unit comprises means for obtaining a primary modulated signal by PSK modulating the first carrier by an information signal, means for receiving the second carrier having a frequency different from the frequency of the first carrier to obtain an addition signal of the first carrier and the second carrier, and means for spread modulating the addition signal with a spread code signal to obtain a composite spread spectrum signal. The demodulation unit comprises means for receiving the composite spread spectrum signal and separately detecting the composite spread spectrum signal into the first spread spectrum signal with the spread primary modulated signal and the second spread spectrum signal with the spread second carrier, means for multiplying together the separately detected signals for despreading, means for demodulating information signals on the basis of the two PSK signals obtained through despreading, and means for adding together the demodulated two information signals and output of the addition result.

According to the spread spectrum communication system of this invention constructed as above, a PN code signal used for despreading is frequency-interpolated among the spectrum of the spread spectrum signal at the time of modulation for the transmission. At the time of demodulating (receiving), the spread spectrum signal and the modulated PN code signal are separately detected and multiplied together for despreading. The obtained two (the first and second) two-phase PSK signals are separately detected using filters. Therefore, it is not necessary to use a clock reproduction circuit, spread code generator, looped synchronous pull-in circuit, synchro holding circuit or other similar circuit elements that are essential in conventional systems.

As can be appreciated from the foregoing description, the spread spectrum communication system of this invention has various advantageous features as in the following.

The present invention system allows various applications to consumer apparatus very easily because the circuit arrangement can be considerably simplified without the necessity of a clock reproducing circuit, spread code generator, a looped synchronous pull-in circuit, synchro holding circuit and the like which are essential circuit elements for the conventional system, and the cost can be reduced accordingly.

The present invention system can stabilize the signal transmission-reception operation without requiring time for synchronous pull-in and without missing synchronization even under the condition of an unnecessity of the synchronous pull-in circuit, synchro holding circuit and the like which require sophisticated circuit techniques.

If the frequencies of the two carriers used for spectrum spreading are set at sufficiently different values, and if the main lobe bandwidths of the frequency spectrums of the spread spectrum signals are arranged so as not to overlap each other, then the arrangement of the demodulating unit is more simplified even though the frequency bandwidth is doubled.

BRIEF DESCRIPTION OF THE DRAWINGS

In the accompanying drawings.

DESCRIPTION OF THE PREFERRED EMBODIMENTS

Some of the preferred embodiments of the spread spectrum communication system according to this invention will be described in detail with reference to the accompanying drawings.

Figure 3:
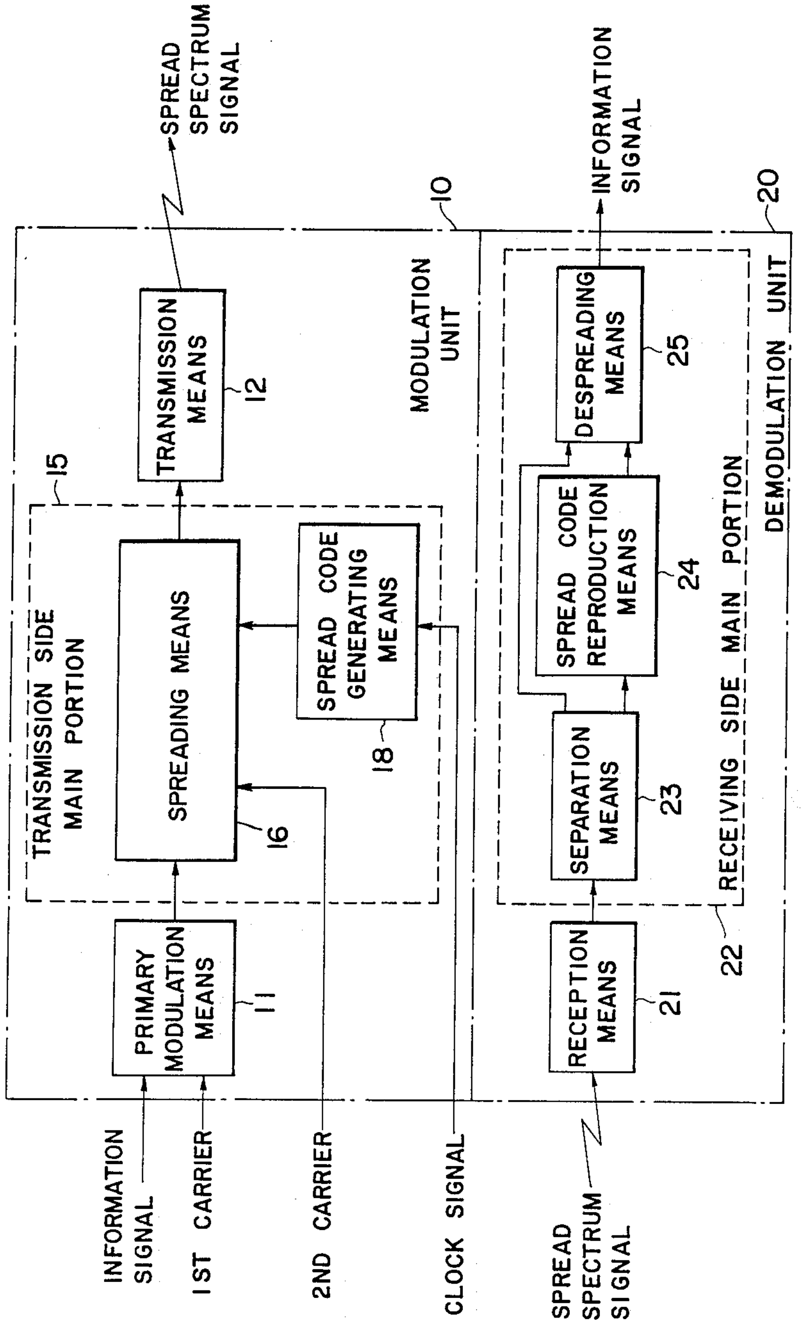
FIG. 3 is a block diagram illustrating a basic concept of the spread spectrum communication system of this invention.

Prior to describing the embodiments, the basic concept of the arrangement of this invention will be described with reference to the block diagram shown in FIG. 3. The communication system of this invention is constructed of a modulation unit 10 for transmission of radio waves, and a demodulation unit 20 for picking up an information signal from a received radio wave. The modulation unit 10 is provided with primary modulation means 11 for carrying an information signal on the first carrier through frequency modulation, phase shift keying or the like, transmission means 12 for transmitting a radio wave subjected to spread spectrum modulation, and a transmission side main portion 15 interposed therebetween for performing spread spectrum modulation as the secondary modulation. The transmission side main portion 15 is constructed of spread code generating means 18 for generating a spread code on the basis of a clock signal, the spreading means 16 for obtaining a first spread spectrum signal through spectrum spreading of the primary modulated signal on the basis of the second carrier and for obtaining a second spread signal through further spread modulation of the first spread signal. The receiving side demodulation unit 20 is provided with reception means for receiving a transmitted radio wave subjected to spectrum spread modulation, and a receiving side main portion 22 for picking up an information signal from a received radio wave through despreading (demodulating). The receiving side main portion 22 is provided with separation means 23 for separating a received radio wave into two signal components corresponding to the first and second spread signals, spread code reproduction means 24 for reproducing the spread code on the basis of the separately detected first or second spread signals, and despreading means for despreading one of the first and second spread signals to obtain the information signal.

Next, the 1st to 8th preferred embodiments of this invention will be described, in order.

Figure 4A:
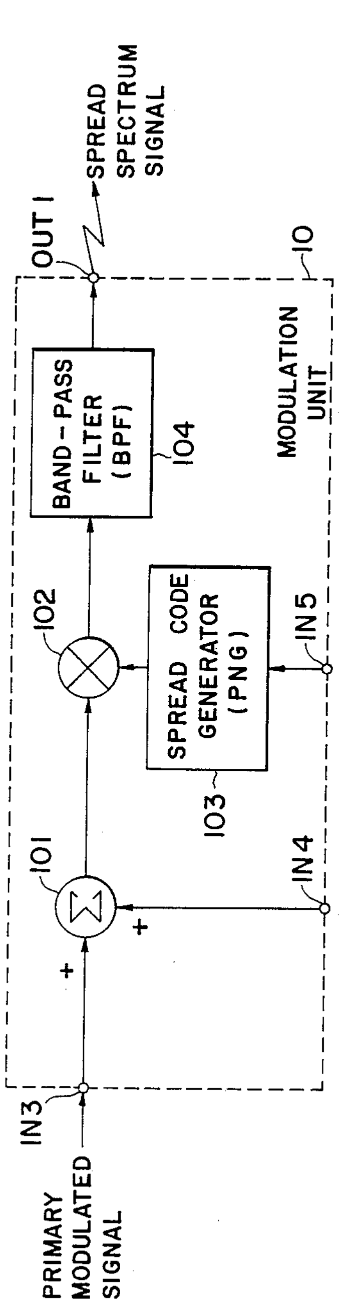
FIG. 4A is a block diagram showing the modulation unit.
Figure 4B:
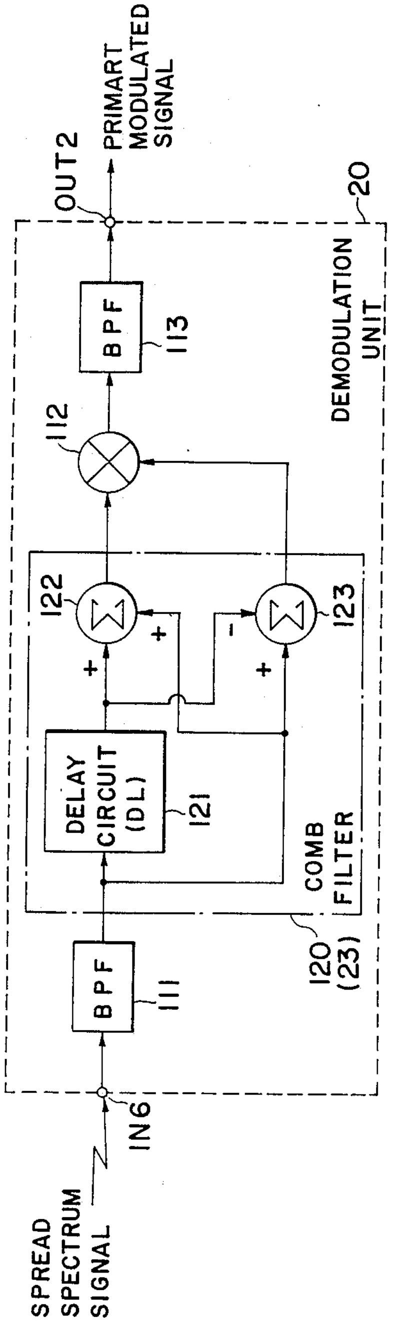
FIG. 4B is a block diagram showing the demodulation unit, respectively of the communication system of the first embodiment of this invention.

FIGS. 4A and 4B are block diagrams of the first embodiment of the spread spectrum communication apparatus according to this invention, wherein FIG. 4A shows a modulation unit 10 (at the transmitting side) and FIG. 4B shows a demodulation unit 20 (at the receiving side). In the figures, some of the elements such as antennas are omitted.

Figure 5A:
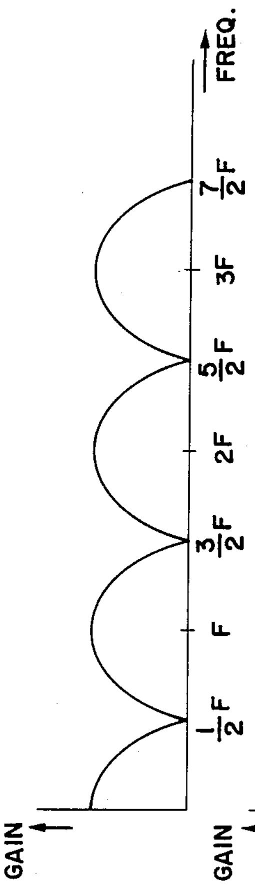
FIGS. 5A and 5B the addition and subtraction frequency characteristic diagrams of the comb filter 120 shown in FIG. 4B.
Figure 5B:
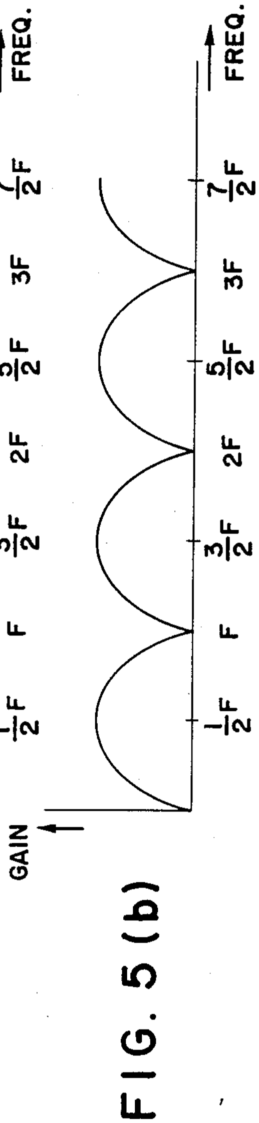

The modulation unit 10 comprises an operation circuit (adder) 101, a multiplier 102, a spread code generator 103 (hereinafter simply called PNG), and a band-pass filter 104 (hereinafter simply called BPF), respectively interconnected as shown in FIG. 4A. The demodulation unit 20 comprises two BPFs 111 and 113, a delay circuit 121 (DL), an adder 122, subtracter 123, and a multiplier 112, respectively interconnected as shown in FIG. 4B. The delay circuit 121, adder 122 and subtracter 123 constitutes a comb filter 120 having two types of frequency characteristics which are illustrated in FIGS. 5(*a*) and 5(*b*) as the addition characteristic and subtraction characteristic, respectively. The specific function and operation thereof will be described with reference to spectrums shown in FIGS. 6 and 7.

Figure 6:
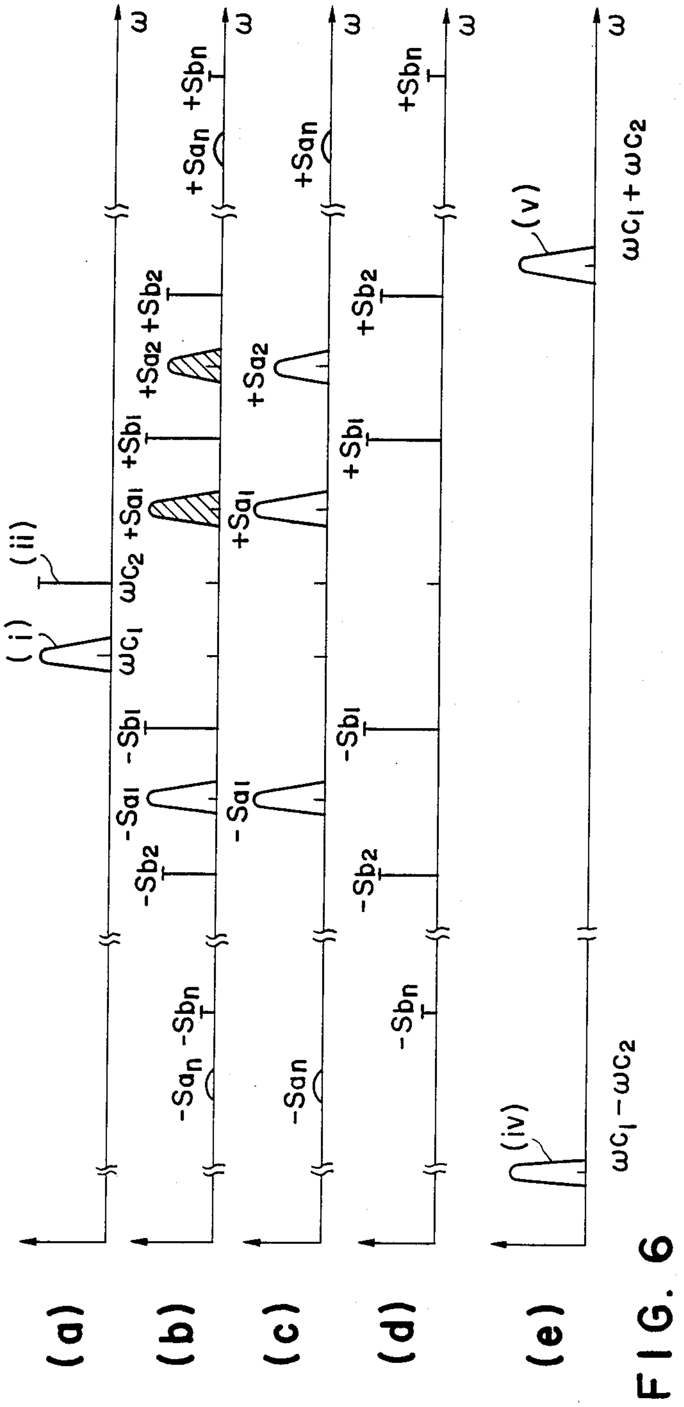
FIG. 6 shows spectrums of the output signals at the modulation and demodulation units of the communication system of the first embodiment.

For transmission at the modulation unit 10, a primary modulated signal d(t) cos $\omega_{c1}$t (two-phase PSK modulated signal in this example) having a spectrum as shown by in (i) FIG. 6(*a*) is supplied to the operation circuit 101 from an input terminal IN3, whereat it is added to a carrier signal cos $\omega_{c2}$t (shown indicated by (ii) of FIG. 6(*a*)) from an input terminal IN4 to obtain an addition signal d(t) cos $\omega_{c1}$t + cos $\omega_{c2}$t which is in turn supplied to the multiplier 102. In the meantime, a clock signal Sc(t) from an input terminal IN4 is being supplied to the spread code generator 103 which generates a spread code signal P(t) based on the clock signal Sc(t). A pseudo code. Of the pseudo noise codes, a maximal period sequence (hereinafter called M sequence) code is widely used so that the pseudo noise code sometimes means an M sequence code in the art. The spread code P(t) generated by the spread code generator 103 is supplied to the multiplier 102 whereat it is multiplied (spectrum spread) by the addition signal d(t) cos $\omega_{c1}$t + cos $\omega_{c2}$t to obtain the spread spectrum signal P(t)[d(t) cos $\omega_{c1}$t + cos $\omega_{c2}$t] (hereinafterindicated by $S_M$(t) where appropriate). Only the main lobe of the spread spectrum signal passes through BPF 103 and is output from an output terminal OUT1.

Figure 7:
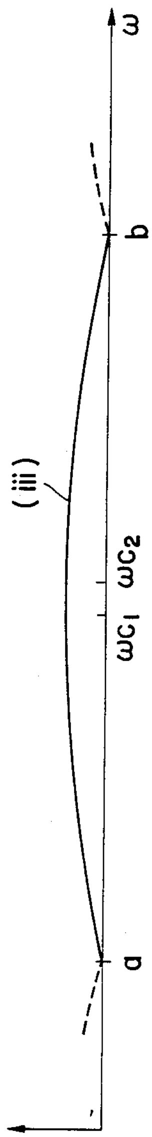
FIG. 7 shows the spectrum of the spread spectrum signal transmitted out of the modulation unit.

The frequency spectrums of the spread spectrum signal will be then described. The frequencies $f_{c1}$ (=$\omega e\frac{1}{2}\pi$) and $f_{c2}$ (=$\omega$e2/2) are selected so as to satisfy the following equations, $f_{c2} \sim f_{c1} = 1/[2(2^n - 1)T0]$ and $f_{c1} = 2m(f_{c2} \sim f_{c1})$, wherein T0 is one bit time length of a clock signal, and n is the number of stages of a shift register assuming that an M sequence code is used at the spread code generator 103 and the shift register is used for an M sequence code generator (not shown), and M is a natural number. In the spread spectrum signal shown in FIG. 6(*b*), the frequency interval between sideband waves +Sa1 and +Sb2, and between sideband waves +Sb1 and +Sb2 is given by $1/[(2^n-1)T0]$. Sideband waves +Sb1 to +San, −Sa1 to −San, and sideband waves +Sb1 to +Sbn, −Sb1 to −Sbn are alternately disposed at equal frequency intervals. FIG. 7 shows the spread spectrum signal whose main lobe is indicated by a solid line at (iii) (between frequencies a and b).

The function and operation of the demodulation unit 20 will be described with reference to FIG. 4B. The spread spectrum signal $S_M(t)$ (refer to FIG. 6(*b*)) incoming to an input terminal IN6 is passed through BPF 111 to remove the frequency components other than the spread spectrum signal, and supplied to one input terminal of the adder 122 and to the positive input terminal of the subtracter 123. An output from the delay circuit 121 is supplied to the other input terminal of the adder 122 and to the negative input terminal of the subtracter 123. The delay circuit 121, adder 122 and subtracter 123 constitutes the comb filter 120 having the addition characteristic and subtraction characteristic (refer to FIGS. 5(*a*) and 5(*b*). With the characteric as shown in FIG. 5(*a*), the gain is doubled at frequencies corresponding to 1/T, 2/T, 3/T, . . . , N/T where N is a natural number and T(=1/F) is a delay time at the delay circuit 121, and becomes 0 at the center frequencies among those above-defined frequencies to form sharp valleys. Conversely, with the subtraction characteristic as shown in FIG. 5(*b*), valleys (with 0 gain) are formed at the frequencies corresponding to 1/T, 2/T, 3/T, . . . , N/T, and the gain is doubled at the center frequencies among those above-defined frequencies. As a result, if the delay time is set at $T=(2^n-1)T0$ to make the frequencies at peaks and valleys of the comb filter 120 coincide with the sideband frequencies of the spread spectrum signal, then it becomes possible to separately detect P(t)d(t) cos $\omega_{c1}$t and P(t) cos $\omega_{c2}$t of the spread spectrum signal $S_M(t)$. Thus, an output signal from the adder 122 is P(t)d(t) cos $\omega_{c1}$t (hereinafter described as S1(t) where appropriate, refer to FIG. 6(*c*)), whereas an output signal from the subtracter 123 is P9(t) cos $\omega_{c2}$t (hereinafter described as S2(t) where appropriate, refer to FIG. 6(*d*)). A particular separation operation by the comb filter 120 will be described later. For simplicity of description, the delay of the spread spectrum signal $S_M(t)$ itself by the delay circuit has not been explained.

The separately detected signals S1(t) and S2(t) according to the above-described principle are supplied to the multiplier 112 for despreading through multiplication, so that the spread code signal P(t) is transformed into a d.c. signal through multiplication, and despread two-phase PSK signals equivalent to the primary modulated signal are obtained respectively as d(t) cos $(\omega_{c1}-\omega_{c2})$t and d(t) cos $(\omega_{c1}+\omega_{c2})$t (indicated as (iv) and (v) at FIG. 6(*e*). Unnecessary frequency components are then removed by BPF 113 to output a two-phase PSK signal d(t) cos $(\omega_{c1}+\omega_{c2})$t from an output terminal OUT2. This two-phase PSK signal has an angular frequency that is Wc2 higher than that at the time of modulation, but this change does not essentially influence the present invention. The output signal from the terminal OUT2 is demodulated by a usual demodulation (not shown) to obtain the information signal d(t). A small crosstalk component is omitted for the purposes of simplifying the description.

The operation of separately detecting the signals S1(t) and S2(t) from the spread spectrum signal $S_M(t)$, i.e., the fundamental operation of the comb filter 120, will be described. A spread spectrum signal $S_M(t-T)$ output from the delay circuit 121 shown in FIG. 4B is given by:

$$S_M(t-T)=P(t-T)[d(t-T)\cos\omega_{c1}(t-T)+\cos\omega_{c2}(t-T)] \quad (3)$$

Assuming that the period $[=(2^n-1)T0]$, of P(t) is equal to the delay time T, and that when observed at every period of P(t), the phase of cos $\omega_{c1}$t is respectively the same at every observed point, and the phase of cos $\omega_{c2}$t becomes reserved alternately with respect to a series of the observed points, then $S_M(t-T)$ becomes:

$$S_M(t-T)=P(t)[d(t-i)\cos\omega_{c1}t-\cos\omega_{c2}t] \quad (4)$$

Therefore, addition output S1(t) of $S_M(t)$ to $S_M(t-T)$ becomes;

$$\begin{aligned} S_1(t) &= SM(t)+S_M(t-T) \\ &= [d(t)+d(t-T)]P(t)\cos\omega_{c1}t \end{aligned} \quad (5)$$

On the other hand, subtraction output S2(t) of $S_M(t)$ by $S_M(t-T)$ becomes:

$$\begin{aligned} S(t) &= S_M(t)+S_M(t-T) \\ &= 2P(t)\cos\omega_{c2}t + \\ &\quad [d(t)-d(t-T)]P(t)\cos\omega_{c1}t \end{aligned} \quad (6)$$

The term d(t)−d(t−T) P(t) cos $\omega_{c1}$t in the equation (6) is a crosstalk component which cannot be separated by the comb filter 120. However, this component is transformed into a d.c. current during the despreading operation described later, thus posing no problem.

Next, the despreading operation will be described in particulars, with reference to the circuit arrangement shown in FIG. 4B. As an output from the multiplier 112, a despread two-phase PSK signal Sp(t) is obtained which is given by:

$$\begin{aligned} Sp(t) &= S_1(t)\times S_2(t) \\ &= [d(t)+d(t-T)]\cos(\omega_{c1}-\omega_{c2})t + \\ &\quad [d(t)+d(t-T)]\cos(\omega_{c1}+\omega_{c2})t \end{aligned} \quad (7)$$

It should be noted that, as any of p(t), d(t) and d(t−T) assumes +1 or −1, the square of it becomes +1, hence the equation (7) may be easily derived from the equations (5) and (6). If the delay time T is sufficiently short when compared with the one bit time length of the information data d(t), d(t−T) can be approximated as d(t). Therefore, demodulated two-phase PSK signal Sp(t) is given by:

$$Sp(t)=2d(t)\cos(\omega_{c1}-\omega_{c2})t+2d(t)\cos(\omega_{c1}+\omega_{c2})t \quad (8)$$

which was confirmed as reasonable upon study of practical circuit operations.

Figure 8A:
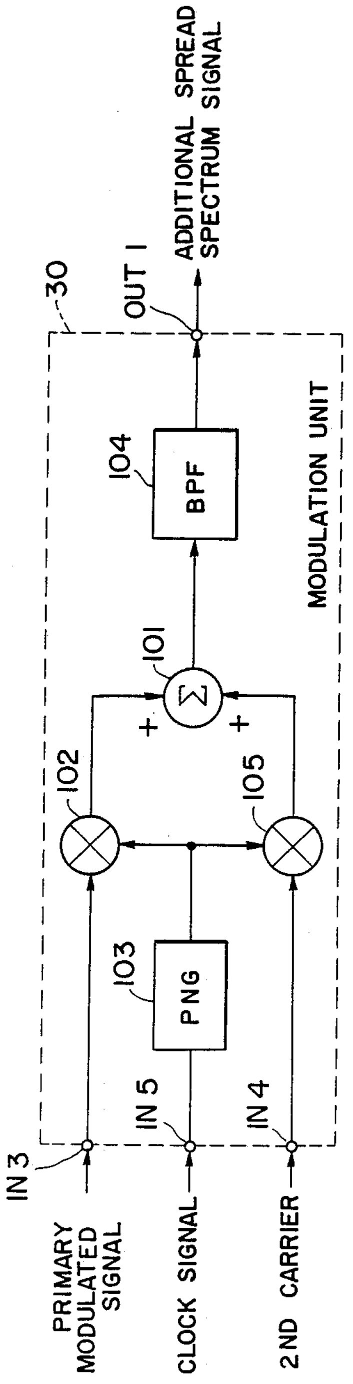
FIGS. 8A and 8B are block diagrams showing the modulation unit and demodulation unit of the second embodiment of the communication system according to the present invention.
Figure 8B:
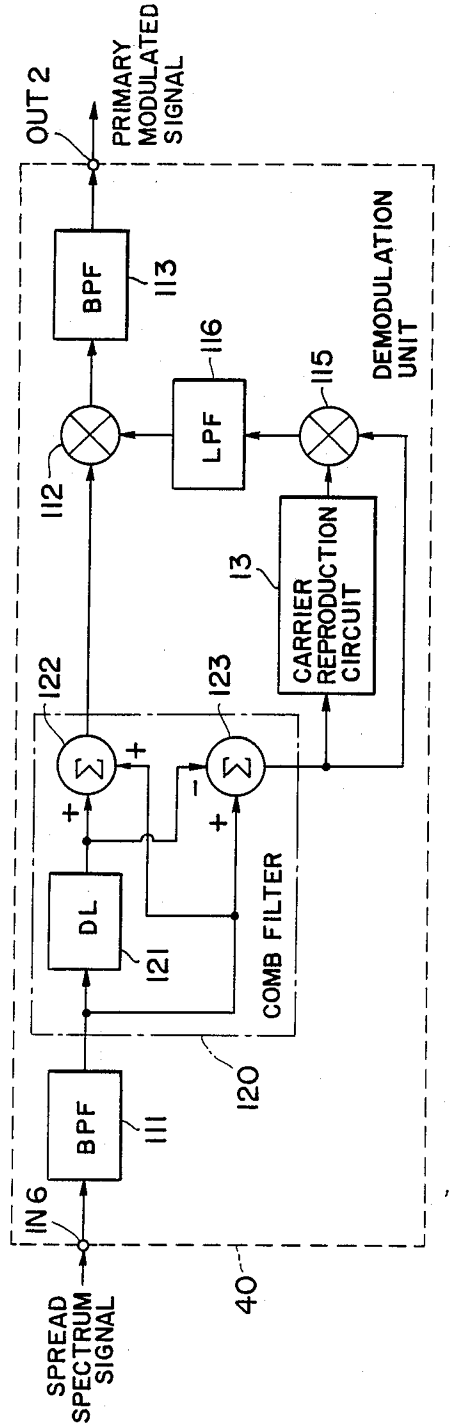

Next, the second embodiment of the demodulation unit realizing the communication system of this invention will be described with reference to the block diagrams shown in FIGS. 8A and 8B and the frequency spectrums shown in FIG. 9. FIG. 8A is a block diagram showing the modulation unit, and FIG. 8B is a block diagram showing the demodulation unit. Like elements to those of the first embodiment are represented using identical reference numerals, and the description therefor is omitted.

As compared with the modulation unit 10 of the first embodiment, the modulating unit 30 of this embodiment differs only in that a multiplier 105 is added thereto with a slight change in interconnection among the elements, and a primary modulated signal and a carrier signal are separately modulated (spared) and thereafter, they are added together. The demodulation unit 40 of this embodiment differs only in that a carrier signal reproduction circuit 114, multiplier 115 and low-pass filter (LPF) 116 are added between the subtracter 123 and the multiplier 112. A combination of the modulation and demodulation units is not limited to only the above embodiments, but various combinations are possible such as a combination of modulation unit 10 and demodulation unit 40, or conversely a combination of modulation unit 30 and demodulation unit 20. The operation of a combination of modulation unit 30 and demodulation unit 40 constructed as above will be described with reference to the frequency spectrums shown in FIG. 9.

Figure 9:
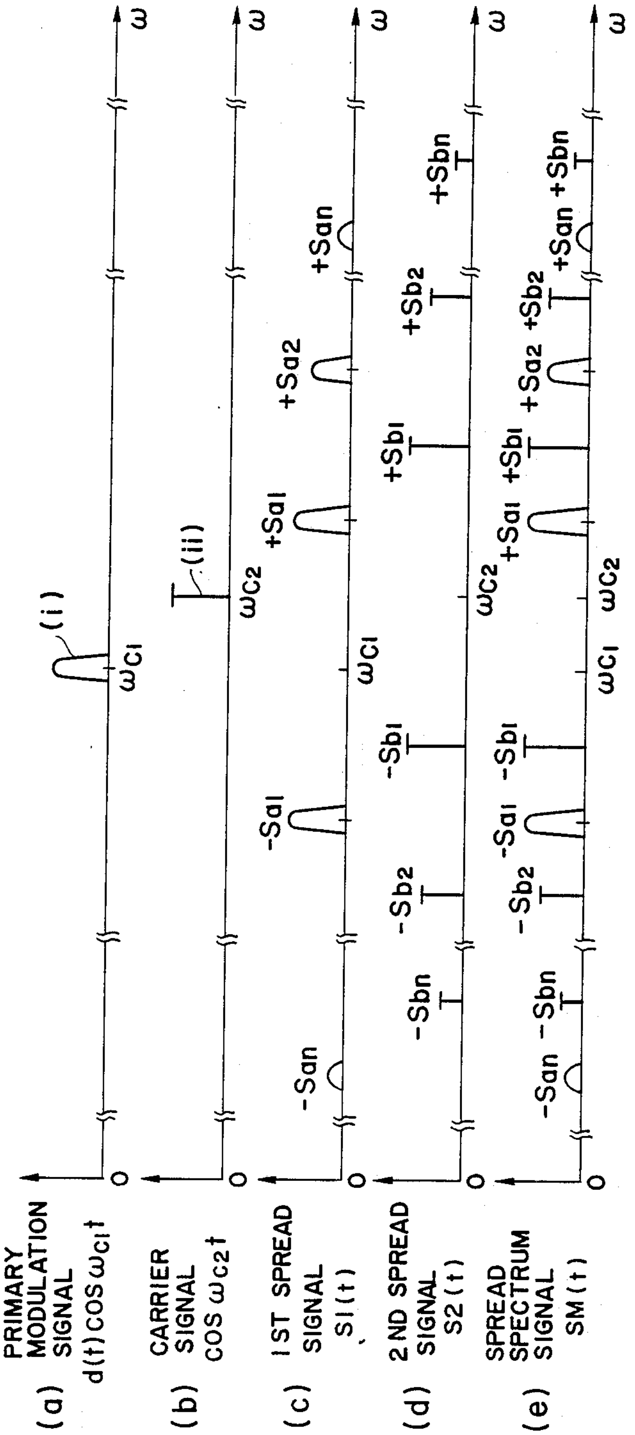
FIG. 9 shows the spectrums of the output signals at the modulation and demodulation units of the communication systems of the second to the sixth embodiments.

A primary modulated signal d(t) cos $\omega_{c1}$t having a spectrum (i) shown in FIG. 9(*a*) from the input terminal IN3 is supplied to the multiplier 102, and a carrier signal cos $\omega_{c2}$t having a waveform (ii) shown in FIG. 9(*b*) from the input terminal IN4 is supplied to the multiplier 105. In the meantime, a clock signal Sc(t) is being supplied from the input terminal IN5 to the spread code generator 103 which generates a spread code signal P(t) based on the clock signal Sc(t) to supply it to the multipliers 102 and 105. The multipliers 102 and 105 thus perform spectrum spreading through multiplication to output respective spread spectrum signals P(t)d(t) cos $\omega_{c2}$t and P(t)d(t) cos $\omega_{c2}$t shown in FIGS. 9(*c*) and 9(*d*) which are added together at the next stage operation circuit 101 to obtain a spread spectrum signal P(t) d(t) cos $\omega_{c1}$t+cos $\omega_{c2}$t (=SM(t)) (refer to FIG. 9(*e*)). Only the main lobe of the spread spectrum signal is passed through the BPF 104 and delivered to the output terminal OUT1.

Figure 10:
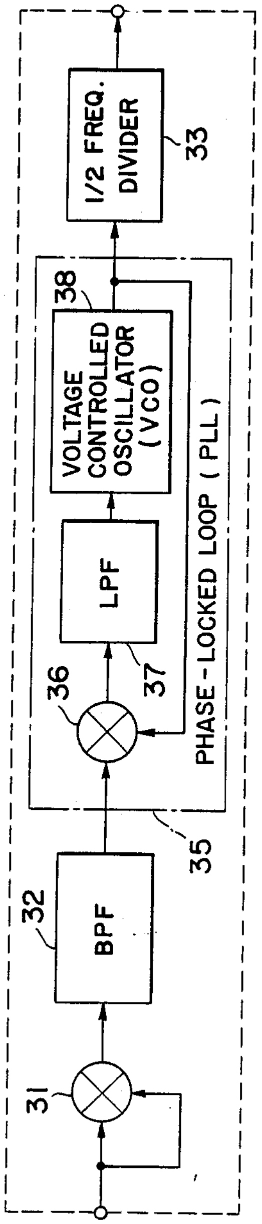
FIG. 10 is a block diagram showing details of the carrier reproduction circuit 13 shown in FIG. 8B.

The function and the operation of the demodulation unit 40 will then be described. The spread spectrum signal $S_M$(t) shown in FIG. 9(*e*) incoming to the input terminal IN6 is passed through the BPF 111 to remove therefrom the frequency components other than the spread spectrum signal, and supplied to one input terminal of the adder 122 and to the positive input terminal of the subtracter 123. An output from the delay circuit 121 is supplied to the other input terminal of the adder 122 and to the negative input terminal of the subtracter 123. In other words, the output from the BPF 111 is supplied to the comb filter 120 having the characteristics shown in FIGS. 5(*a*) and 5(*b*). Obviously, the frequencies at peaks and valleys of the comb filter 120 are made coincident with the sideband frequencies of the spread spectrum signal. As a result, P(t)d(t) cos $\omega_{c1}$t and P(t) cos $\omega_{c2}$t are separately detected from the spread spectrum signal $S_M$(t). The adder 122 outputs a spread spectrum signal P(t)d(t) cos $\omega_{c1}$t[=S1(t)] as shown in FIG. 9(*c*), and the subtracter 123 outputs a spread spectrum signal P(t) cos $\omega_{c2}$t[=S2(t)] as shown in FIG. 9(*d*). The spread spectrum signal S2(t) is supplied to the carrier reproducing circuit 13 and multiplier 115. The carrier reproduction circuit 13 is constructed, for example, of multipliers 31 and 36, BPF 32, LPF 37, voltage-controlled oscillator 38 (hereinafter called VCO), and ½ frequency divider 33, respectively interconnected as shown in FIG. 10. This circuit is a multiplied-by-2 type carrier reproduction circuit. In this circuit, the subtraction output S2(t) is first squared by the multiplier 31. The subtraction output S2(t) is approximately P(t) cos $\omega_{c2}$t so that the binary signal P(t) is transformed into a d.c. current through square operation and the carrier signal P(t) cos $\omega_{c2}$t becomes P(t) cos $\omega_{c2}$t. Unnecessary frequency components are removed at the next stage BPF 32 and thereafter, the signal is supplied to a phase-locked loop 35 (PLL) constructed of the multiplier 36 (or phase comparator), LPF 37 (or loop filter) and VCO 35, to accordingly obtain a carrier signal having a frequency twice as high as the original and having a predetermined amplitude with unnecessary noise components removed therefrom. The obtained carrier signal is passed through the ½ frequency divider 33 to be output as the reproduced carrier signal cos $\omega_{c2}$t.

The carrier signal cos $\omega_{c2}$t reproduced by the carrier reproduction circuit 13 according to the above-described principle and the spread spectrum signal S2(t) directly supplied from the subtracter 123 are supplied to the multiplier 115 to obtain a spread code P(t) equivalent to that at the time of modulating. The spread code P(t) is supplied to the multiplier 112 whereat it is multiplied by the spread spectrum signal S1(t) from the adder 122 to obtain a despread two-phase PSK signal d(t) cos $\omega_{c1}$t (in actual case, although delay during transmission is present, this delay is omitted for simplicity of the description) which is in turn passed to BPF 113 to remove therefrom unnecessary frequency components and is output from the output terminal OUT2. For simplicity of description, small crosstalk components have also been omitted.

Figure 11A:
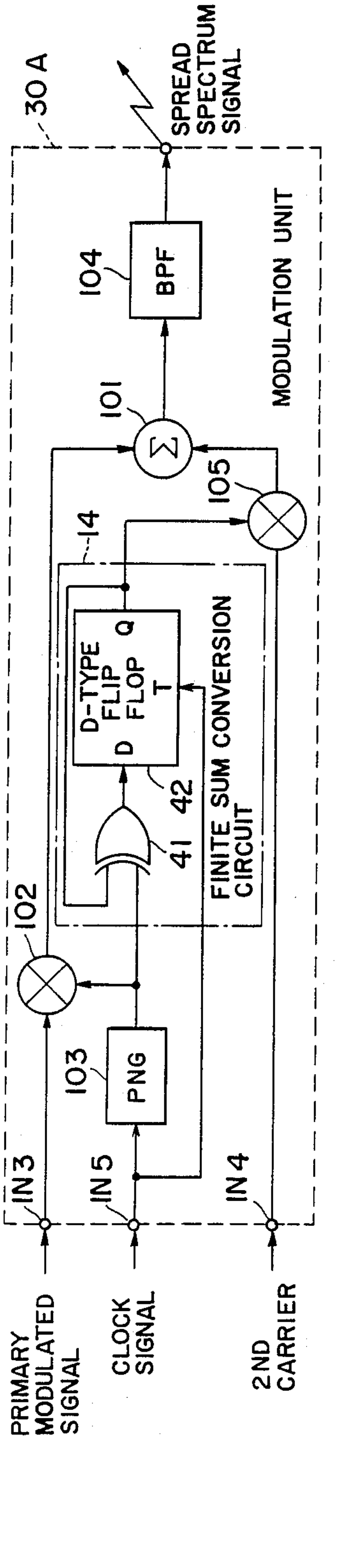
FIGS. 11A and 11B are block diagrams showing the arrangement of the modulation and demodulation unit of the communication system of the third embodiment of this invention.
Figure 11B:
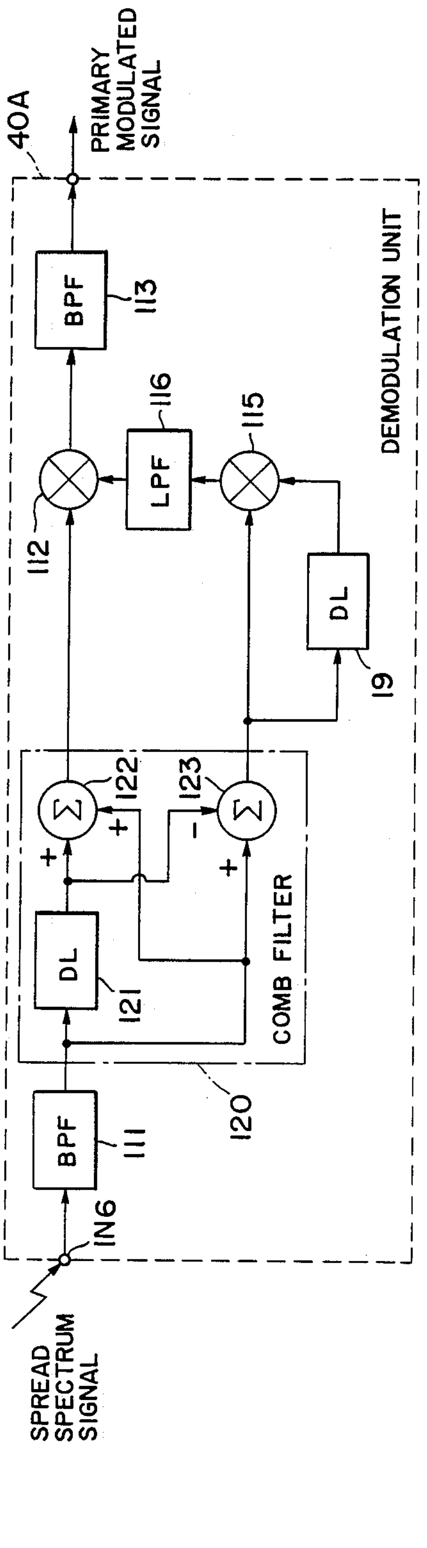

Next, the third embodiment of the spread spectrum communication system of this invention will be described with reference to FIGS. 11A and 11B. In FIGS. 11A and 11B, similar or corresponding elements to those shown in FIGS. 4A and 4B of the first embodiment and in FIGS. 8A and 8B of the second embodiment are represented using identical reference numerals, and the duplicated description therefor is omitted.

The difference between FIG. 11A and FIG. 8A of the second embodiment is that the modulation unit 30A has a finite sum conversion circuit 14 between the spread code generator (PNG) 103 and the multiplier 105, and that the demodulation unit 40A has a delay circuit (DL) 19 instead of the carrier reproduction circuit 13. The finite sum conversion circuit 14 of the modulation circuit 30A is constructed from an exclusive OR (EX-OR) gate 41 and D-type flip-flp 42 (hereinafter abbreviated as DFF), interconnected as shown in FIG. 11A. The delay circuit 19 of the demodulation unit 40A is arranged to delay a finite sum conversion output signal by one time slot. The other circuit arrangement is the same as that of the second embodiment.

Figure 12:
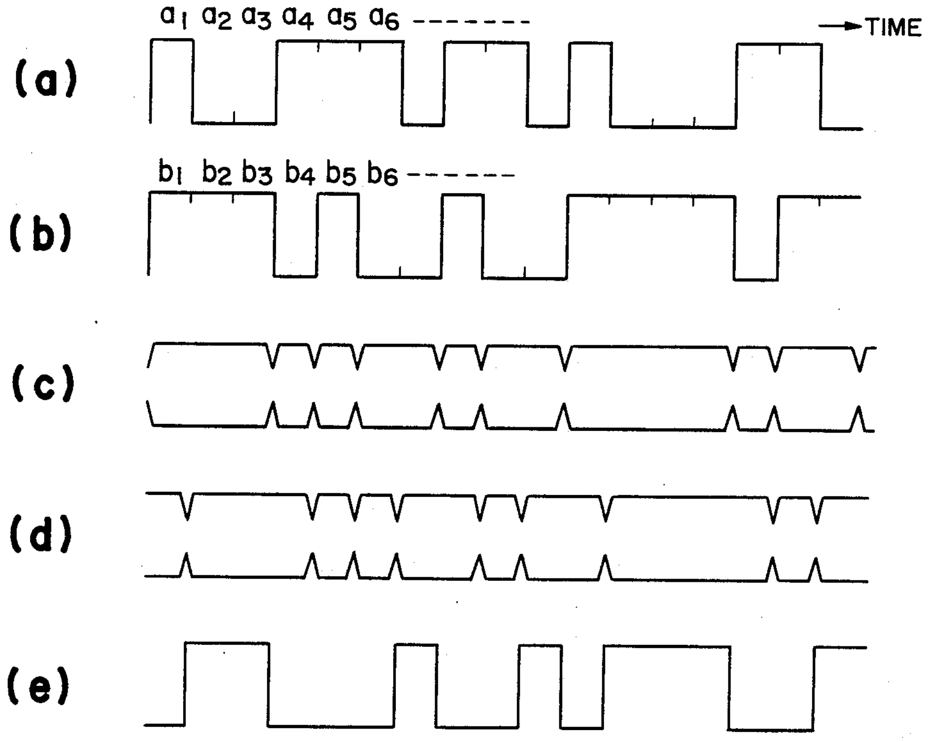
FIG. 12 is a timing chart of the output signals at the communication system of the third embodiment shown in FIGS. 11A and 11B.

The particular function and operation of the modulation unit 30A and demodulation unit 40A will be described with reference to the spectrums shown in FIGS. 9 and 7 and the timing chart shown in FIG. 12.

At the transmission side, an information signal d(t) is modulated by the first carrier $\omega_{c1}$ at the primary modulator (not shown) to obtain a primary modulated signal d(t) cos $\omega_{c1}$t (in this example, a two-phase PSK modulated signal) having the waveform as shown in FIG. 9(*a*) which is in turn supplied to the multiplier 102 via the input terminal IN3. In the meantime, a clock signal Sc(t) is being supplied from the input terminal IN5 to the spread code generator (PNG) 103 whereat a spread code signal P(t) is generated on the basis of the clock signal Sc(t). A pseudo noise code is generally and usually used as the spread code. Of the pseudo noise codes, an M period sequence code is widely used so that the pseudo noise code sometimes means the M sequence in the art. The spread code signal P(t) generated by the spread code generator 103 is supplied to the multiplier 102 whereat it is multiplied by the two-phase PSK signal for spectrum spreading, to thus obtain a spread spectrum signal P(t)d(t) cos $\omega_{c1}$t (also indicated by S1(t) where appropriate) refer to FIG. 9(*c*)). The spread code signal P(t) and the clock signal Sc(t) are respectively supplied to the EX-OR gate 41 and the T (clock) terminal of DFF 42, of the finite sum conversion circuit 14. The finite sum conversion circuit 14 performs a Modulo 2 addition such that the finite sum conversion output signal bi is given by:

$$b_i = \Sigma ai = b_i - 1 + ai \qquad (9)$$

(Mod. 2)

where the finite sum conversion output signal bi is a signal obtained at point (b) in FIG. 11A, and the spread code signal P(t) which is a binary input signal ai obtained at point (a) in FIG. 11A. The relation between ai and bi is shown in FIG. 12(*a*) and 12(*b*), namely, b1=ai+b0=1, B2=a2+b1=1, b3=a3+b2=1, b4=a4+b3=0, and so on.

A second carrier cos $\omega_{c2}$t indicated by (ii) in FIG. 9(*b*) is supplied from the input terminal IN4 to the multiplier 105 whereat it is multiplied by an output signal Ps(t) from the finite sum conversion circuit 14 for spreading, to therefore obtain a spread spectrum signal S2(t)−Ps(t) cos $\omega_{c2}$t shown in FIG. 9(*d*) which is then supplied to the adder 101 whereat it is added to the spread spectrum signal S1(t) (refer to FIG. 9(*c*)). The addition signal is supplied to the next stage BPF 104 to pass only the main lobe of the spread spectrum signal and output it from the output terminal OUT1. The addition spread spectrum signal S1(t)+S2(t) is given by:

$$S1(t)+S2(t)=P(t)d(t)\cos\omega_{c1}t+Ps(t)\cos\omega_{c2}t \qquad (10)$$

The frequency spectrums of the spread spectrum signal will be described. The frequency interval between sideband waves +Sa1 and +Sb2, and between sideband waves +Sb1 and +Sb2 shown in FIGS. 9(*c*) and 9(*d*) is given by $[(2^n-1)T0]^{-1}$, wherein T0 is one bit time length of the clock signal Sc(t), and n is the number of stages of a shift register assuming that an M sequence is used at the spread code generator 103 and the shift register is used for an M sequence generator (not shown). Two types of sideband waves +Sa1 to +San, −Sa1 to −San, and sideband waves +Sb1 to +Sbn, −Sb1 to −Sbn are alternately disposed at equal frequency intervals. Therefore, the frequency intervals between both the sidebands San series and Sbn series are given by $[2(2^n-1)T0^{-1}]$. FIG. 7 shows the frequency characteristic of the spread spectrum signal whose main lobe is indicated by a solid line (between frequencies at points a and b).

How the frequency is set, is an important point of the present invention. The frequency is set such that spectrums of the spread spectrum signal S2(t) are disposed between sideband signals of the spread spectrum signal S1(t), which is determined in accordance with the transfer rate of the carriers cos $\omega_{c1}$t and cos $\omega_{c2}$t and the two-phase PSK modulated signal c(t) cos $\omega_{c1}$t, the time length of one bit of the clock signal Sc(t), the use of a M sequence, and the number of stages of a shift register generating the used M sequence.

Next, the function of the demodulating unit 40A will be described with reference to FIG. 11B as well as FIG. 5. A spread spectrum signal $S_M$(t) (=S1(t)+S2(t)) refer to FIG. 9(*e*)) incoming to the input terminal IN6 is passed to BPF 111 to remove frequency components other than the spread spectrum signal, and is supplied to one input terminal of the adder 122 and to the positive input terminal of the subtracter 123. An output from the delay circuit 121 is supplied to the other input terminal of the adder 122 and to the negative input terminal of the subtracter 123. As described previously, the comb filter 120 having the addition characteristic and subtraction characteristic (refer to FIGS. 5(*a*) and 5(*b*)) is constructed of the delay circuit 121, adder 122 and subtracter 123. Assuming that the delay time of the delay circuit 121 is T (=1/F), the addition operation and subtraction operation are performed as shown in FIGS. 5(*a*) and 5(*b*), respectively. The delay operation thereof is to be referred to the description given previously with respect to FIGS. 5(*a*) and 5(*b*).

The delay circuit 19 newly added to the third embodiment will be described next. The delay circuit 19 is provided for giving a delay of one slot of the finite sum conversion output signal Ps(t). Therefore, the input and output signals of the delay circuit have waveforms as shown in FIGS. 12(*c*) and 12(*d*). Both the signals are multiplied at the multiplier 115 and passed to LPF to remove the carrier components to therefore give spread code signal P(t) equivalent to that at the time of modulating as shown in FIG. 12(*e*). The spread code signal P(t) is supplied to the multiplier 112 whereat it is multiplied by the spread spectrum signal S1(t) for despreading. Therefore, the multiplier 112 outputs a demodulated signal of the spread spectrum signal S1(t) which is passed to the BPF 104 of the demodulation unit 30A to remove therefrom unnecessary frequency components, to therefore output a two-phase PSK signal d(t) cos $\omega_{c1}$t from the output terminal OUT2. Ffor simplicity of the description, the delay of the spread spectrum signal $S_M$(t) itself by the delay circuit 121 has not been explained.

The spread spectrum signal $S_M$(t) is then subjected to separate detection. The associated operation of the comb filter 120 and the like is the same as that previously given with respect to the equations (3) to (6), so that the duplicate description is omitted herein.

As described previously, the term [d(t)−d(t−T)]P(t) cos $\omega_{c1}$t is the cross talk component which cannot be separated by the comb filter 120. However, since the delay time is set very short when compared with the one chip time length (one bit time length) of the information data d(t), the cross talk component can be neglected. Thus, a subtraction output S2(t) is given by:

$$S2(t)\approx 2Ps(t)\cos\omega_{c2}t \qquad (11)$$

Next, the despreading operation will be described particularly with reference to the circuit arrangement shown in FIG. 11B. First, generating (demodulating) the spread code signal P(t) will be described. The subtraction output S2(t) is supplied to the multiplier 115 and delay circuit 19 for generation of the spread code signal P(t). The delay circuit 19 delays the finite sum conversion output signal Ps(t) by a one chip time length (one time slot) to output therefrom a delayed subtraction output S2(t−τ) where τ is the delay time. The delayed subtraction output S2(t−τ) is multiplied by S2(t) to obtain a spread code signal P(t). This operation is a conventional "delay detection" so that the detailed analysis of the principle is omitted. An output from the multiplier 115 is passed to the LPF 116 to remove therefrom unnecessary carrier components, demodulated into a signal equivalent to the spread code signal P(t) at the time of modulating, and supplied to the multiplier 112. The operations of the multiplier 112 and the BPF 113 are the same as that previously described.

Figure 13A:
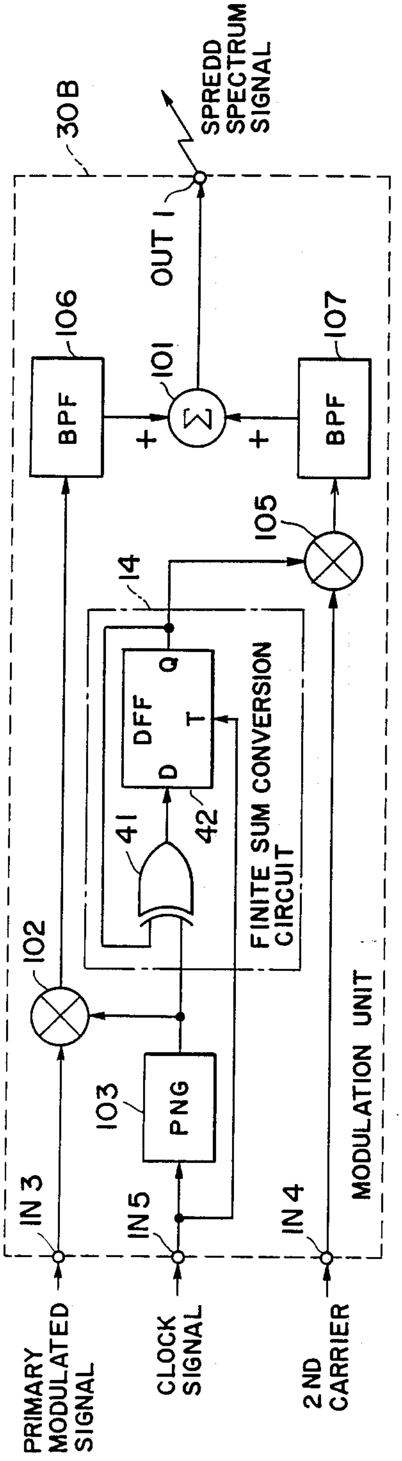
FIGS. 13A and 13B are block diagrams of the respective modulation and demodulation units of the communication system of the fourth embodiment of this invention.
Figure 13B:
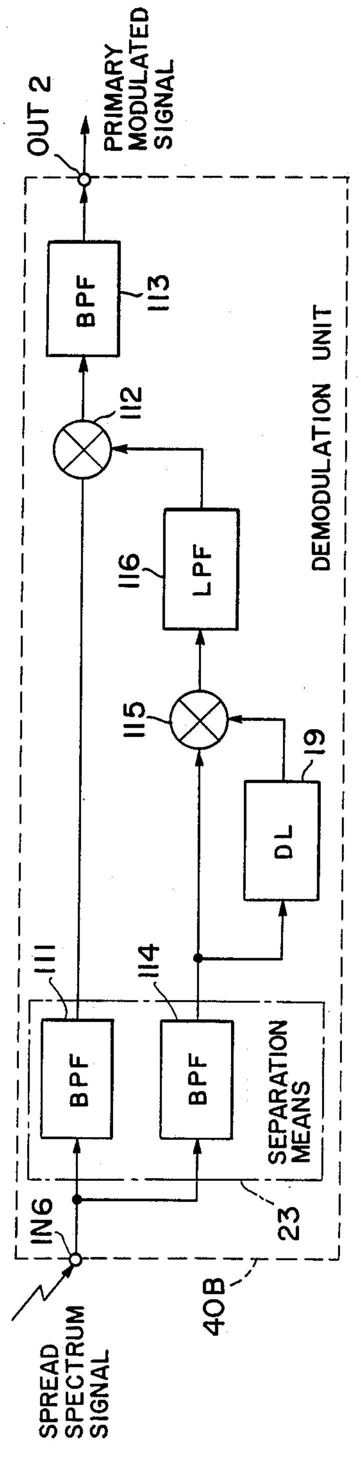
Figure 14:
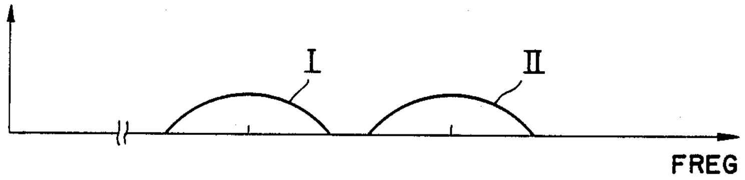
FIG. 14 shows the spectrum waveforms at the communication system of the fourth embodiment shown in FIGS. 13A and 13B.
Figure 15:
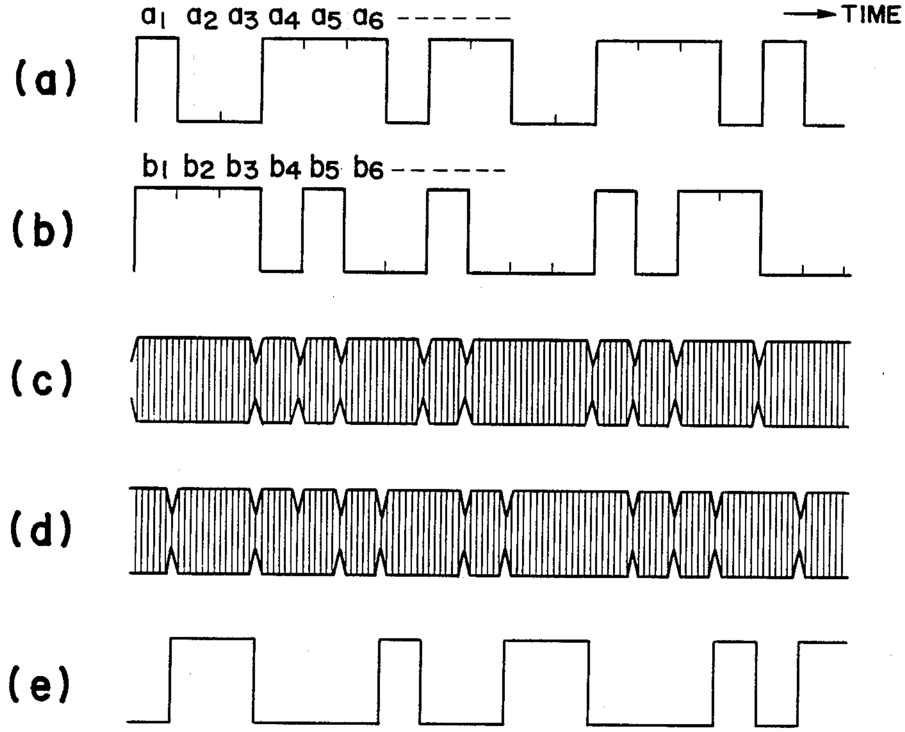
FIG. 15 is a timing chart showing the output signals at the communication system of the fourth embodiment of this invention.

Next, the fourth embodiment of the spread spectrum communication system of this invention will be described with reference to the circuit block diagrams shown in FIGS. 13A and 13B, the spectrum waveforms shown in FIG. 14, and the frequency characteristic diagram shown in FIG. 15. FIG. 13A is a block diagram of the modulation unit, and FIG. 13B is a block diagram of the demodulation unit, wherein like elements to those of the third embodiment shown in FIGS. 11A and 11B are represented using identical reference numerals, and the description therefor omitted. The modulation unit 30B differs from the modulation unit 30A of the first embodiment in that the BPF 106 is inserted between the multiplier 102 and the operation circuit 101, and that an additional BPF 107 is inserted between the multiplier 105 and the operation circuit 101. The remaining circuit arrangement is the same. The BPF 106 passes only the frequency spectrum main lobe of the spread spectrum signal S1(t) [=P(t)d(t) cos $\omega_{c1}$t] from the multiplier 102 and supplies it to the operation circuit 101. Therefore, the operation circuit 101 outputs an addition spread spectrum signal S1(t) +S2(t) (=$S_M$(t), refer to the equation (3)) having the spectrum waveform as shown in FIG. 14, in the similar manner to the third embodiment, and delivers it to the output terminal OUT1. To the operation of the finite sum conversion circuit 14, and the signal waveforms shown in FIGS. 15(*a*) and 15(*b*), the same description as that of the modulation unit 30A of the third embodiment is applicable so that the particular function and operation principle thereof are omitted. The arrangement of the demodulation unit 40B can be simplified, as described later, more than the demodulation unit 40A, by setting the frequencies of the carriers $\omega_{c1}$ and $\omega_{c2}$ at sufficiently spaced points as shown by the waveforms I and II of FIG. 14, and by not overlapping the pass bands of BPFs 106 and 107 (the bands of main lobes I and II of the frequency spectrums of the spread spectrum signals S1(t) and S2(t)). In this case however, the frequency bandwidth becomes twice as wide as that of the third embodiment.

Next, the circuit arrangement and function of the demodulation unit 40B will be described with reference to FIG. 13B as well as the frequency characteristic diagram of the spread spectrum signal shown in FIG. 14 and the timing chart shown in FIG. 15. As understood from a comparison between FIGS. 13B and 11B, the demodulation unit 40B is simplified more than the demodulation unit 40A, with the comb filter 120 removed therefrom. Instead, the BPF 114 is added between the input terminal IN6 and the multiplier 115 and delay circuit 19. With the circuit arrangement as above, an addition spread spectrum signal $S_M$(t) (=S1(t)+S2(t)=P(t)d(t) cos $\omega_{c1}$t+Ps(t) cos $\omega_{c2}$(t) as shown in FIG. 14 is supplied from the input terminal IN6 to the BPFs 111 and 114. The BPF 111 passes only the spread spectrum signal S1(t) and supplies it to the multiplier 112. The BPF 114 passes only the spread spectrum signal S2(t) and supplies it to the multiplier 115 and delay circuit 19. Namely, the spread spectrum signals S1(t) and S2(t) are separately obtained by the BPFs 111 and 114.

The delay circuit 19 gives a delay of one time slot of the finite sum conversion output signal Ps(t). Therefore, the input and output signals of the delay circuit 19 have the waveforms as shown in FIGS. 15(*c*) and 15(*d*), respectively. Both the signals are multiplied at the multiplier 115, and passed to the LPF 116 to remove therefrom the carrier frequency components to detect a spread code signal P(t) shown in FIG. 15(*e*), equivalent to that at the time of modulating. The spread code signal P(t) is then supplied to the multiplier 112 whereat it is multiplied by the spread spectrum signal S1(t) from the BPF 111 for despreading. As a result, the multiplier 112 outputs a demodulated signal of the spread spectrum signal S1(t), passes it to the BPF 113 to remove therefrom unnecessary frequency components, and delivers it to the output terminal OUT2 as the a two-phase PSK signal d(t) cos $\omega_{c1}$t.

Figure 16A:
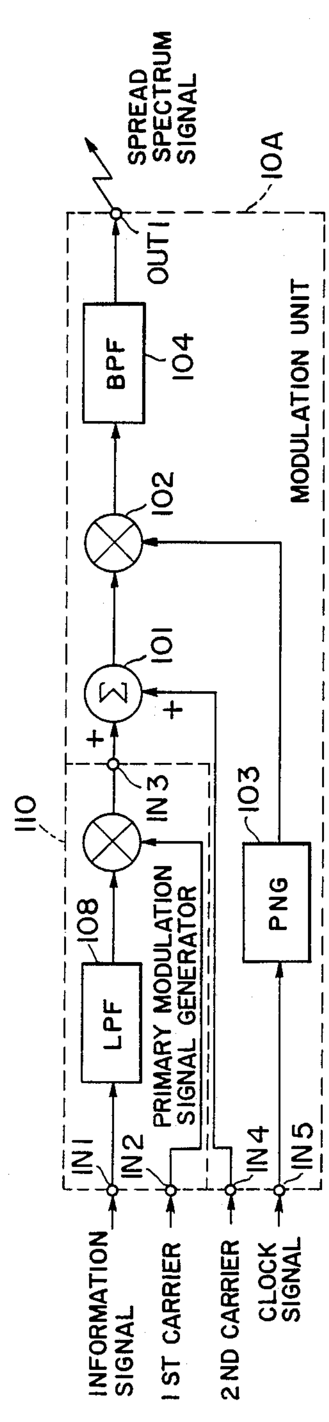
FIGS. 16A and 16B are block diagrams of the respective modulation and demodulation units of the communication system of the fifth embodiment of this invention.

Next, the fifth embodiment of this invention will be described with reference to the block diagrams shown in FIGS. 16A and 16B. The modulation unit 10A of the fifth embodiment of the communication system of this invention shown in FIG. 16A differs from the modulation unit 10 of the first embodiment described with FIG. 4A in that there is included a primary modulation signal generator 110 for generating a primary modulation signal to be supplied to the input terminal IN3. The primary modulation signal generator 110 is constructed of a LPF 108 and a multiplier 109, the LPF 108 passing only the low frequency component of the information signal inputted from an input terminal IN0, and the multiplier 109 superposing the output from the LPF 108 onto the first carrier signal input from the input terminal IN2. The remaining circuit arrangement of the modulation unit 10A is the same as that of the modulation unit 10 of the first embodiment shown in FIG. 4A.

Next, the demodulation unit 50 of the fifth embodiment will be described with reference to FIG. 16B. The demodulation unit 50 has a despreading signal generator 125 as spread code reproduction means 24 (refer to FIG. 3) inserted between the subtracter 123 of the comb filter 120 and the multiplier 112, respectively of the demodulating unit 20 of the first embodiment shown in FIG. 4B. In addition, the BPF 113 is replaced with a LPF 117. The remaining circuit arrangement is the same as that shown in FIG. 4B, the duplicate description being omitted only with identical reference numerals affixed thereto.

Figure 16B:
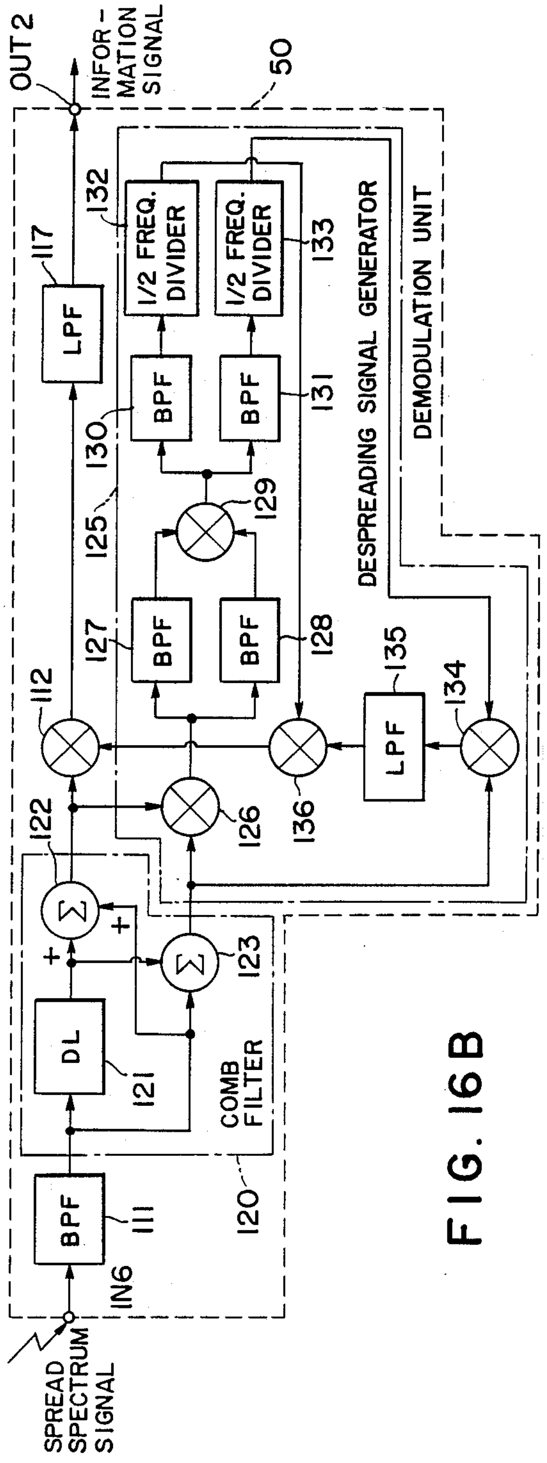

Referring to FIG. 16B, the despreading signal generator 125 is constructed of a multiplier 126 for multiplying together the outputs from the adder 122 and subtracter 123 of the comb filter 120, two BPFs 127 and 128 for passing only particular frequency components of the output from the multiplier 126, a multiplier 129 for multiplying together the outputs from BPFs 127 and 128, two BPFs 130 and 131 for passing only particular frequency components of the output from the multiplier 129, two ½ frequency dividers 132 and 133 for halving the frequency of each of the outputs from BPFs 130 and 131, a multiplier 134 multiplying together the outputs from the subtracter of the comb filter 120 and output from the ½ frequency divider 133, a LPF 135 for passing only the low frequency component of the output from the multiplier 134, and a multiplier 136 for multiplying together the outputs from the ½ frequency divider 132 and the LPF 135.

The operation of the fifth embodiment will be described next.

First, in the transmission operation, at the primary modulation signal generator 110 connected to the modulation unit 10A, an information signal d(t) (information is data, in this case) is supplied from the input terminal IN1 to the multiplier 109 via the LPF 108. The first carrier signal cos $\omega_{c1}$t is supplied from the input terminal IN2 to the multiplier 109 whereat it is multiplied by the information signal d(t) to generate a primary modulation signal cos $\omega_{c1}$t (in this example, two-phase PSK modulated signal) as indicated by (i) in FIG. 6(*a*) and supply it to the input terminal IN3 of the modulation unit 10A.

The succeeding operation is the same as that of the modulation unit 10 of the first embodiment as described with FIGS. 6(*b*) to 6(*e*), so that the duplicate description therefor is omitted.

Next, the function of the demodulation unit 50 will be described with reference to FIG. 16B. In the demodulation unit 50, the operation of the comb filter 120 serving as the separation means 23 is the same as that of the first embodiment described with FIGS. 5(*a*) and 5(*b*) and FIGS. 6(*b*) to be 6(*e*), so that the description therefor is omitted.

The addition output signal S1(t) separately detected as described previously is supplied to the multipliers 112 and 134, and the subtraction output signal S2(t) is supplied to the multipliers 126 and 134. Therefore, both the signals are multiplied together at the multiplier 126 for despreading to obtain a demodulated two-phase PSK signal (multiplication output signal) d(t) [cos ($\omega_{c1}-\omega_{c2}$)t+cos ($\omega_{c1}+\omega_{c2}$)t] equivalent to that at the time of modulation, with the spread code signal P(t) being transformed into a d.c. current through multiplication. The obtained signal is the sum of two two-phase PSK signals d(t) cos ($\omega_{c1}-\omega_{c2}$)t and d(t) cos ($\omega_{c1}+\omega_{c2}$)t, respectively indicated at (iv) and (v) of FIG. 6(*e*), which can be separately detected by BPFs having properly selected pass bandwidths. The two two-phase PSK signals d(t) cos ($\omega_{c1}-\omega_{c2}$)t and d(t) cos ($\omega_{c1}+\omega_{c2}$) are separated by BPFs 127 and 128 which are in turn multiplied together at the multiplier 129 to obtain two squared output signals cos 2 $\omega_{c1}$t and cos 2 $\omega_{c2}$t. These signals are separated at the next stage BPFs 130 and 131, and subjected to ½ frequency division at the ½ frequency dividers 132 and 133 to obtain first and second reproduced carrier signals cos $\omega_{c1}$t and cos $\omega_{c2}$t which are supplied to the multipliers 136 and 134, respectively. At the multiplier, the second carrier signal is multiplied by the subtraction output signal S2(t) from the subtracter 123 to detect a reproduced spread code signal P(t) and cos 2 $\omega_{c1}$t the latter of which is removed at the next stage LPF 135 so that only the spread code signal P(t) is output to the multiplier 136. The frequency-divided output signal cos $\omega_{c1}$t from the ½ frequency divider 132 is being supplied to the multiplier 136 so that both the signals are multiplied to generate a despreading signal P(t) cos $\omega_{c1}$t which is output to the multiplier 112. The addition output signal S1(t) from the adder 122 is being supplied to the multiplier 112 so that both the signals are multiplied to perform at a time both despreading of the addition output signal S1 (t) and synchronous detection thereof with the two-phase PSK signal, to therefore detect the information signal d(t) and the carrier signal cos 2 $\omega_{c1}$t. The carrier signal cos 2 $\omega_{c1}$t is removed by the next stage LPF 117 so that only the demodulated information signal d(t) is output to the output terminal OUT2.

Figure 17A:
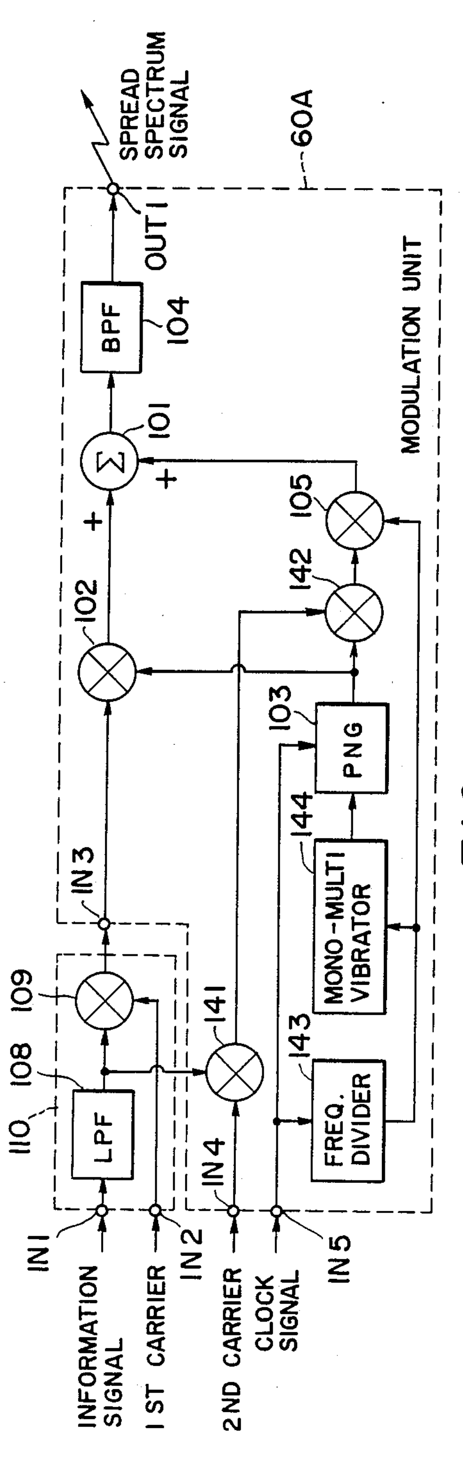
FIGS. 17A and 17B are block diagrams of the respective modulation and demodulation units of the communication system of the sixth embodiment of this invention.

Next, the sixth embodiment of this invention will be described with reference to FIGS. 17,A 17B and FIGS. 18 to 20. FIG. 17A is a block diagram of the modulation unit 60A and FIG. 17B is a block diagram of the demodulation unit 60B.

The modulation unit 60A is constructed of a LPF 103, five multipliers 109, 141, 102, 142 and 105, operation circuit (adder) 101, spread code generator (PNG) 103, frequency divider 143, mono-stable multivibrator 144 (hereinafter simply called mono-multi), BPF 104 and etc., respectively interconnected as shown in FIG. 17A. Signals input to the input terminals IN1 to IN5 and output to the output terminal OUT1 shown in FIG. 17A correspond to those input and output signals of the modulation unit 10A of the fifth embodiment shown in FIG. 16A. Reference numerals 101 to 105, and 108 to 110 designate like elements to those shown in FIG. 16A.

Figure 17B:
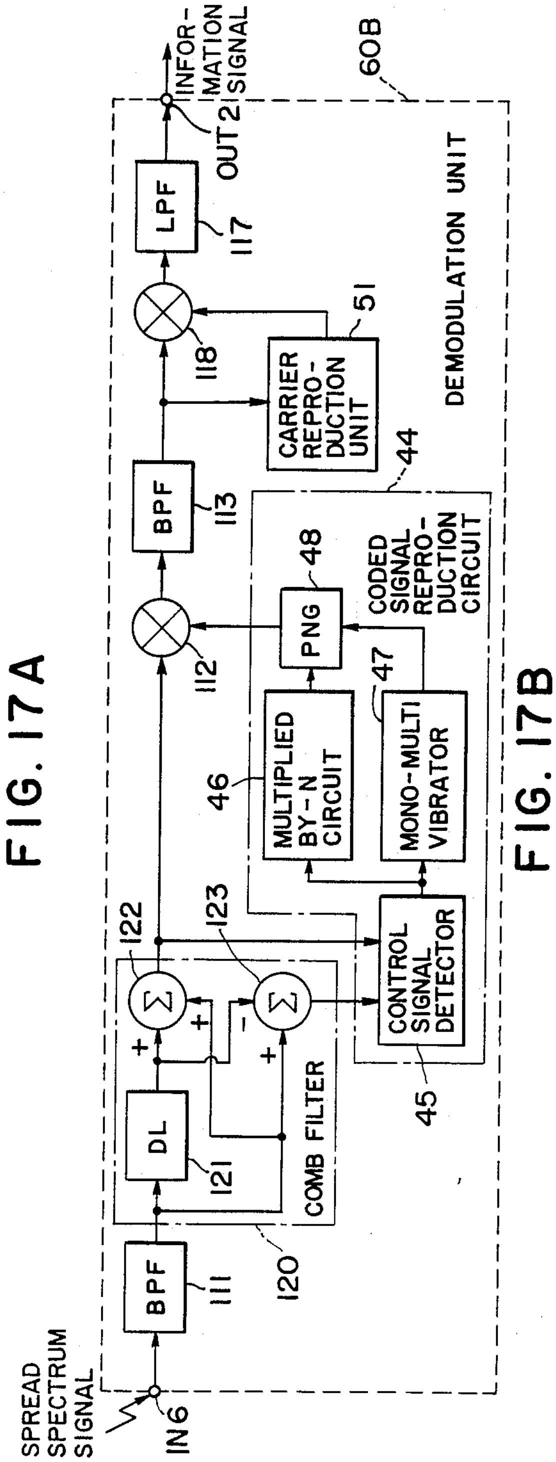
Figure 18:
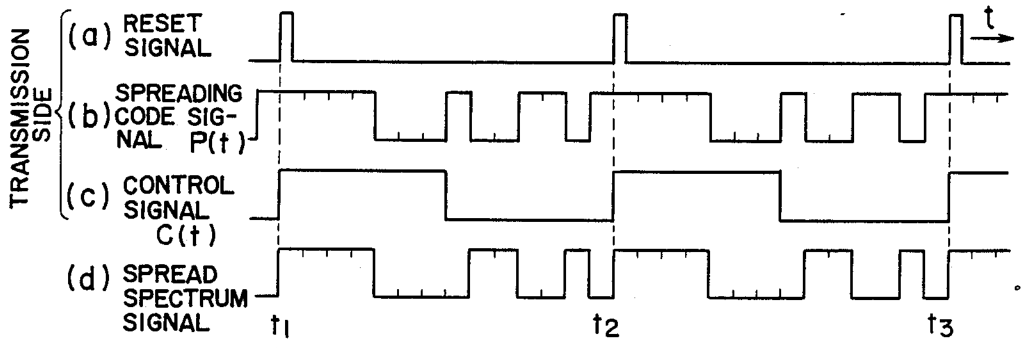
FIG. 18 is a timing chart showing the output signals at the modulation and demodulation units of the sixth embodiment shown in FIGS. 17A and 17B.

The demodulation unit 60B is constructed, as shown in FIG. 17B, of two BPFs 111 and 113, delay circuit (DL) 121, adder 122, subtracter 123, control signal detector 45 (hereinafter described as C(t) detector where appropriate), multiplied-by-2 circuit 46, mono-multi 47, spread code generator 48, carrier reproducing unit 51, two multipliers 112 and 118 and etc., respectively interconnected as shown in FIG. 17B. The delay circuit 121, adder 122, and subtracter 123 constitutes the comb filter 120 having two types of addition and subtraction characteristics shown in FIGS. 5(*a*) and 5(*b*), similar to the first to fifth embodiments.

The outputs from the adder 122 and subtracter 123 of the comb filter 120 are supplied to the coded signal reproduction circuit 44 to reproduce the carrier signal, the coded signal reproduction circuit 44 being constructed of the C(t) detector 45, multiplied-by-N circuit 46, mono-multi vibrator 47 and PNG 48.

The operation of the modulating unit 60A and demodulation unit 60B of the sixth embodiment as constructed above will be described hereinunder.

First, in the transmission operation, the fundamental operation of the modulation unit 60A does not differ from that previously described with FIGS. 9 and 7. Namely, a two-phase PSK modulated signal is input to the input terminal IN3 as a primary modulated signal to generate a spread code signal P(t) composed of a pseudo spread code, to output a spread spectrum signal to the output terminal OUT1.

In the sixth embodiment, an M sequence code is used as the pseudo spread code. A frequency divider 143 and mono-multi vibrator 144 is provided for resetting operation within the period of the M sequence code. This details the M sequence code generator described with reference to the third embodiment.

The operation of generating a spread code will be described with reference to the timing chart shown in FIGS. 18(*a*) to 18(*d*). A clock signal Sc(t) is frequency-divided by the frequency divider 143 to obtain a control signal C(t) shown in FIG. 18(*c*) which is supplied to the mono-multi 144. The mono-multi 144 generates a pulse signal shown in FIG. 18(*a*) at the timings of the leading edge of the control signal C(t) obtained through differentiation or the like. The pulse signal is supplied to the spread code generator 103 as a reset signal. Upon reception of the reset signal and the clock signal Sc(t), the spread code generator 103 generates a spread code signal P(t) shown in FIG. 18(*b*).

The generated spread code signal P(t) is supplied to the multipliers 102 and 142 whereat it is multiplied by the two-phase PSK signal d(t) cos $\omega_{c1}$t and by d(t) cos $\omega_{c2}$t for spectrum spreading to thus obtain a spread spectrum signal P(t)d(t) cos $\omega_{c1}$t and P(t)d(t) cos $\omega_{c2}$t which are supplied to the adder 101 and subtracter 105, respectively. The control signal C(t) from the frequency divider 143 is being supplied to the multiplier 105 so that both the signals are multiplied to obtain an output signal P(t)d(t)C(t) cos $\omega_{c2}$t (hereinafter described S2(t) where appropriate) and supply it to the adder 101. The operation of BPF 104 is the same as that previously described with FIG. 7 and FIG. 9(*e*), so the description therefor is omitted. One frame of the spread code signal P(t) is constructed of, as shown in FIG. 18(*b*), 14 bits per one frame between times t1 and t2 and between times t2 and t3.

The basic operation and function of the demodulating unit 603 are similar to those described with the first to fifth embodiments. The operation of the comb filter 120 has been described with reference to FIG. 9. Only the control signal detector 45 of the coded signal reproduction circuit 44 which is the characteristic circuit element of the sixth embodiment will be described.

Figure 19:
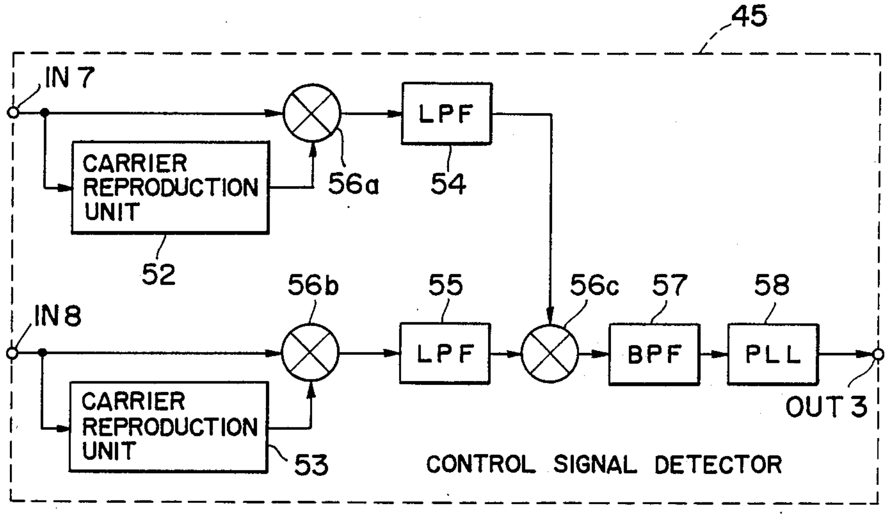
FIG. 19 is a block diagram showing details of the control signal detector 45 of the modulating unit of the sixth embodiment shown in FIG. 17B.
Figure 20:
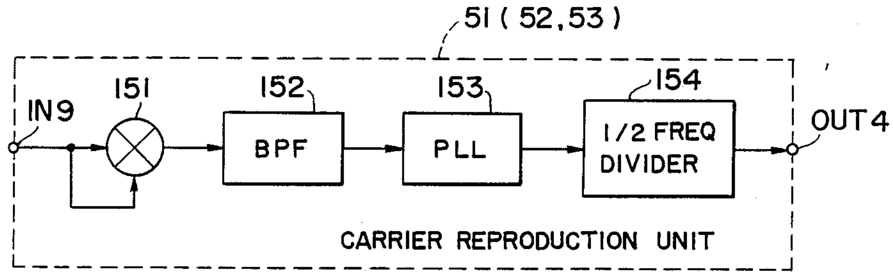
FIG. 20 is a block diagram showing details of each of the carrier reproduction units 51 to 53 shown in FIG. 17B and 19.

The particular circuit arrangement of the C(t) detector 45 is constructed of, as exemplarily shown in FIG. 19, two carrier reproduction units 52 and 53, three multipliers 56*a* to 56*c*, BPF 57, PLL (phase locked loop) 58, two LPFs 54 and 55 and etc., respectively interconnected as shown in FIG. 19. An addition output signal S1(t) is supplied from an input terminal IN7 to the multiplier 56*a* and carrier reproduction unit 52, whereas a subtraction signal S2(t) is supplied from an input terminal IN8 to the multiplier 56*b* and carrier reproducing unit 53. Each of the carrier reproduction units 52 and 53 is constructed of, as exemplarily and particularly shown in FIG. 20, a multiplier 151, BPF 152, PLL 153 and ½ frequency divider 154, respectively interconnected as shown in FIG. 20. This carrier reproduction unit is a multiplied-by-2 type carrier reproduction circuit. At the multiplier 151, the addition output signal S1(t) is squared. The subtraction output signal S2(t) is also squared at the carrier reproduction unit 53, the description therefor is omitted since the operation principle is both the same. Since the carriers of the signals S1(t) and S2(t) are modulated by two phases of 0 degree and 180 degrees similar to the case of the two-phase PSK signal, the signal S1(t) with its frequency doubled at the multiplier 151 is converted into a carrier with its frequency doubled and with a continuous phase. In particular, since the signal S1(t) is approximately P(t) cos $\omega_{c1}$t, the carrier cos $\omega_{c1}$t isconverted into a carrier cos $\omega_{c1}$t, with the binary signal P(t) being transformed into a d.c. current through square operation. The output from the multiplier 151 is then passed to BPF 152 to remove therefrom unnecessary frequency components, and supplied to PLL 153. PLL 153 is constructed of a multiplier (phase comparator), LPF, VCO and the like. Unnecessary noise components of the input signal are removed at PLL 153 to therefore obtain a predetermined amplitude of a carrier with its frequency double. This carrier undergoes the ½ frequency divider 154 to thus output a reproduced carrier cos $\omega_{c1}$t.

Similarly, a reproduced carrier cos $\omega_{c2}$t is obtained at the carrier reproducing unit 53. These carriers cos $\omega_{c1}$t and cos $\omega_{c2}$t are supplied to the multipliers 56*a* and 56*b*, respectively, whereat they are multiplied by the addition output signal S1(t) and by the subtraction output signal S2(t), respectively. Thereafter, unnecessary frequency components are removed at the next stage LPFs 54 and 55, respectively, to therefore demodulate P(t)d(t) and P(t)d(t)C(t). Both the demodulated signals are supplied to the multiplier 56*c* to multiply them together and obtain a control signal C(t). Unnecessary noise components are further removed therefrom at BPF 57 and PLL 58 to output a control signal C(t) of good quality to the output terminal OUT2. As above, the C(t) detector 45 separately detects the control signal C(t).

Figure 1:
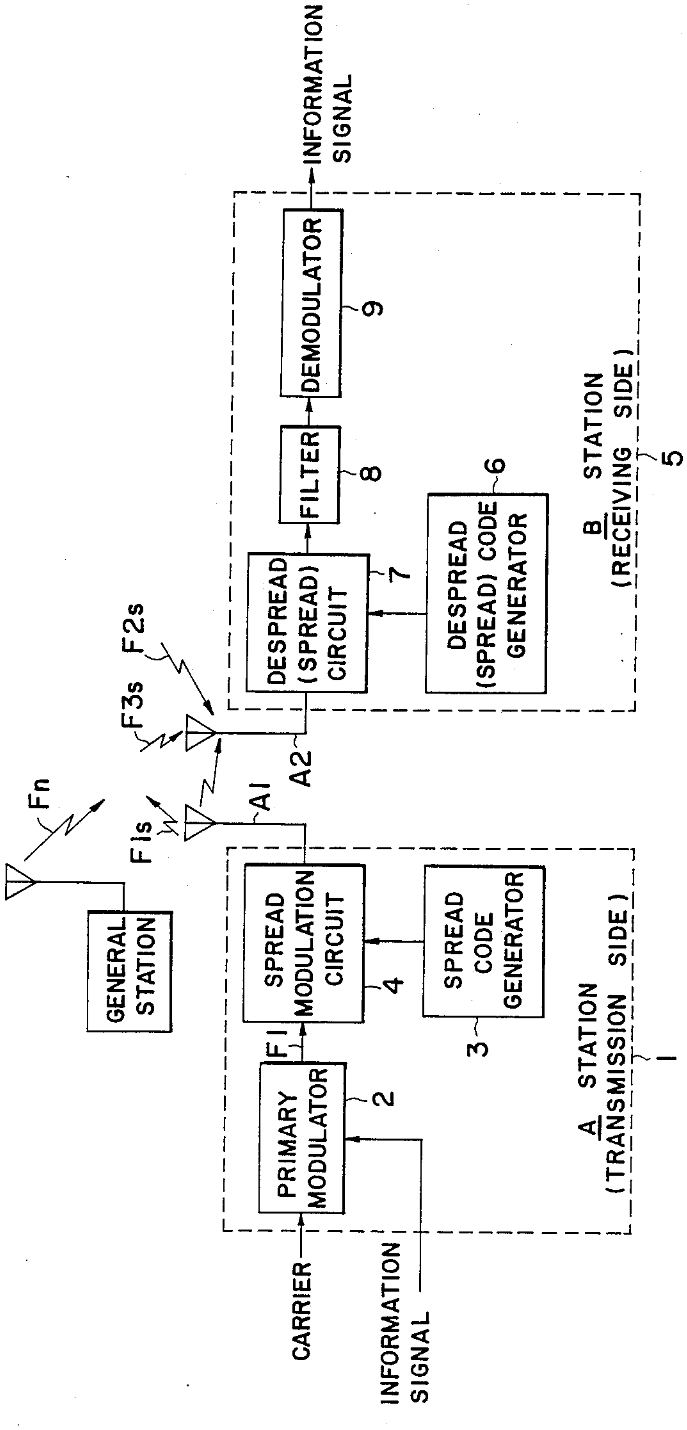
FIG. 1 is a block diagram showing the basic arrangement of a conventional spread spectrum communication system.
Figure 2:
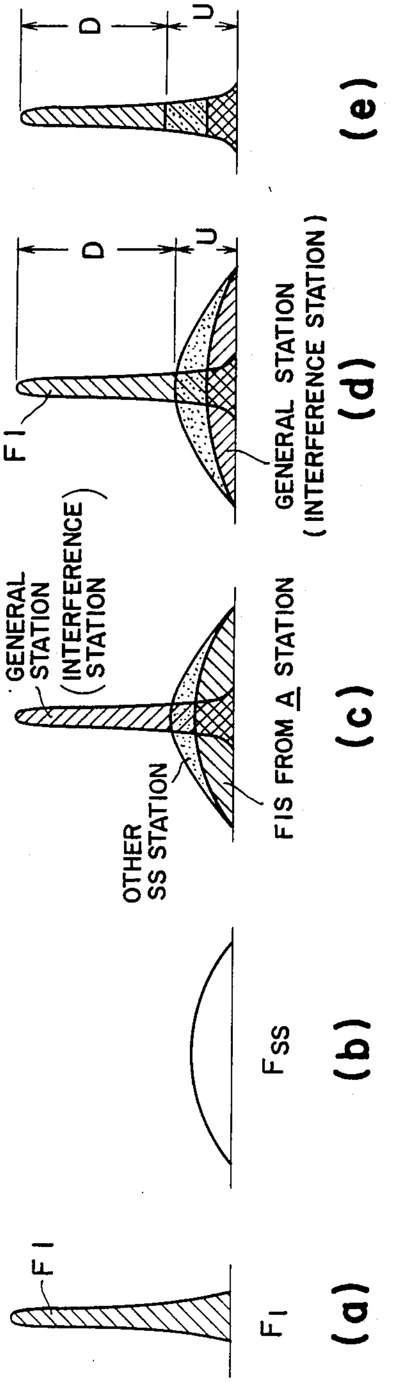
FIG. 2 shows spectrums of the output signals at various circuit portions of the conventional system shown in FIG. 1.

The obtained control signal C(t) is then supplied to the next stage multiplied-by-N circuit 46 and to the mono-multi 47. The multiplied-by-N circuit 46 multiplies the control signal C(t) by N (in the example shown in FIG. 18, N=14) to obtain a clock signal equivalent to the clock signal Sc(t) at the transmission side (modulation unit 60A). The mono-multi 47 on the other hand generates a reset signal equivalent to the reset signal at the transmission side and supplies it to the spread code generator 48, together with the clock signal Sc(t). The spread code generator 103 at the transmission side (and as those conventional generators 3 and 6 shown in FIG. 1) so that a signal equivalent to the spread code signal P(t) at the time of modulation can be obtained using the clock signal and reset signal. The spread code signal P(t) together with the addition output signal P(t)d(t) cos t is supplied to the multiplier 112 to multiply them together for despreading. After removing unnecessary frequency components at BPF 113, a two-phase PSK signal d(t) cos $\omega_{c1}$t can be demodulated. The carrier reproducing unit 51 is input to the demodulated two-phase PSK signal d(t) cos $\omega_{c1}$t to reproduce the carrier cos $\omega_{c1}$t, in accordance with the same operation principle as that of the carrier reproduction unit 52, and supply it to the multiplier 118. The multiplier 118 has reproduced two-phase PSK signal d(t) cos $\omega_{c1}$t input as well as the carrier cos $\omega_{c1}$t to multiply them together for synchronous detection. After removing unnecessary frequency components at LPF 17, it is possible to obtain only the reproduced information signal d(t) at the output terminal OUT2.

The operation of the comb filter 120 as separation means is the same as that described with the equations (3) to (6) of the first embodiment, so the duplicate description is omitted herein.

If the delay time T is sufficiently short as compared with the one bit time length of the information data d(t), the term [d(t)−d(t−T)] of the equations (5) and (6) becomes very small so that the signals S1(t) and S2(t) can be approximated as:

$$S1(t) \approx [d(t)+d(t-T)]P(t) \cos \omega_{c1}t \quad (12)$$

$$S2(t) \approx [d(t)+d(t-T)]P(t)c(t) \cos \omega_{c2}t \quad (13)$$

Next, the operation of detecting the control signal C(t) at the C(t) detector 45 will be described in particular with reference to FIG. 19. The carrier reproduction unit 52 is inputted with the addition output signal S1(t) from the input terminal IN6 and generates a reproduced carrier cos $\omega_{c1}$t which is supplied to the multiplier 56*a* whereat it is multiplied by the signal S1(t) to obtain P(t) (1+cos 2 $_{c1}$t) [d(t)+d(t−T)]/2. This signal is then passed to LPF 54 to remove therefrom a high frequency component and obtain [d(t)+d(t−T)]P(t)/2 which is supplied to the multiplier 56*c*. Similarly, the carrier reproduction unit 53 is input with the subtraction signal S2(t) from the input terminal IN7, and generates a reproduced carrier cos $\omega_{c2}$t which is supplied to the multiplier **56*b* whereat it is multiplied by the signal S2(t) to obtain P(t)C(t)(1+cos 2 $\omega_{c2}$t) [d(t)+d(t−T)]/2. This signal is then passed to LPF 55 to remove therefrom a high frequency component and obtain P(t)C(t) [d(t)+d(t−T)]/2 which is supplied to the multiplier 56*c*. At the multiplier, both the signals are multiplied together to obtain $[\frac{1}{2}\times \overline{d(t)+d(t-T)\ P(t)}]^2C(t)$. Signals other than the control signal C(t) are transformed into substantially a d.c. current so that only the control signal C(t) is outputted from BPF 57. The next stage PLL 58** is used to further effectively reduce noise components of the input signal to thus obtain a predetermined amplitude (binary signal of 1 or 0) of the control signal. Thus, a binarized control signal C(t) is output to the output terminal OUT3.

Next, the operation principle of the multiplied-by-N circuit 46, mono-multi 47, and spread code generator 48 will be described. The multiplied-by-N circuit 46 multiplies the control signal C(t) input thereto by N to obtain the clock signal Sc(t) which is supplied to the spread code generator 48. The multiplied-by-N operation corresponds to the N frequency division at the frequency divider 144 of the modulation unit 60A. The mono-multi 47 is input with the control signal C(t) to generate the reset signal as shown in FIG. 18(*a*) which is supplied to the spread code generator 48. Therefore, the operation of the spread code generator 48 becomes precisely the same as that of the spread code generator 103 at the transmission side (modulation unit 60A). An output signal from the spread code generator 48 becomes thus a reproduced spread code signal P(t).

Next, the despreading operation will be described in particular with reference to the block diagram shown i FIG. 17B. The multiplier 112 is input with the reproduced spread code signal P(t) and addition output signal S1(t) to multiply together for despreading so that a demodulated signal $[d(t)+d(t-T)]\ \overline{(P(t))}^2\cos\omega_{c1}t$ is obtained, whose d.c. componenet and the like are removed at the next stage BPF 23 to obtain a demodulated two-phase PSK signal [d(t)+d(t−T)] cos $\omega_{c1}$t.

Lastly, the operation of demodulating the information data d(t) will be described. The operation of the carrier reproduction unit 51 is basically the same as that of the carrier reproduction units 52 and 53. The carrier reproduction unit 51 is input with the demodulated two-phase signal [d(t)+d(t−T)] cos $\omega_{c1}$t from BPF 113 to reproduce the carrier cos $\omega_{c1}$t. The reproduced carrier cos $\omega_{c1}$t together with the demodulated two-phase PSK signal [d(t)+d(t−T)] cos $\omega_{c1}$t is supplied to the multiplier 119 to multiply them together for synchronous detection. After removing unnecessary noise components, the information data d(t) are demodulated and output to the output terminal OUT2.

Next, the seventh embodiment of the present invention will be described with reference to FIGS. 21A, 21B and 22.

Figure 21A:
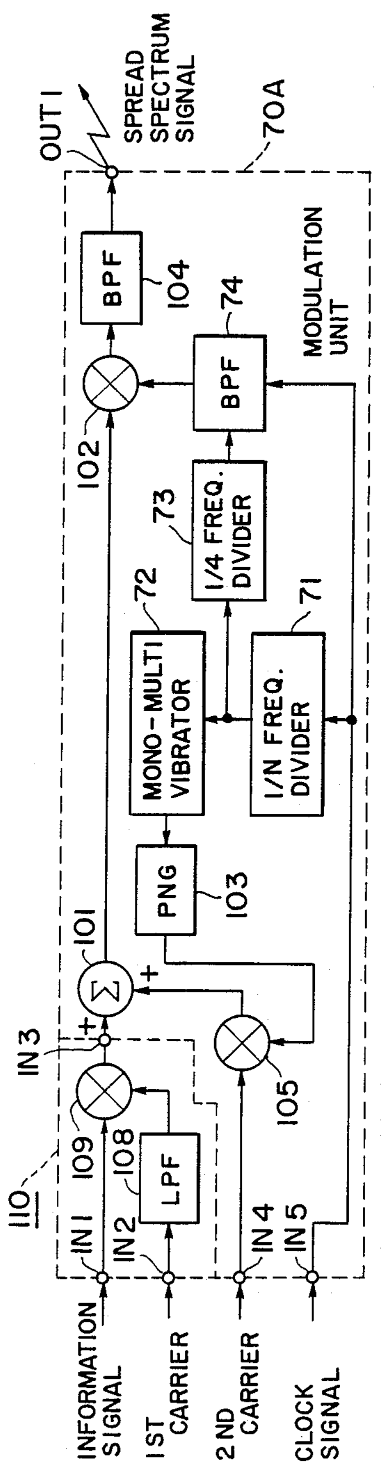
FIGS. 21A and 21B are block diagrams showing the respective modulation and demodulation units of the communication system of the seventh embodiment of this invention.
Figure 21B:
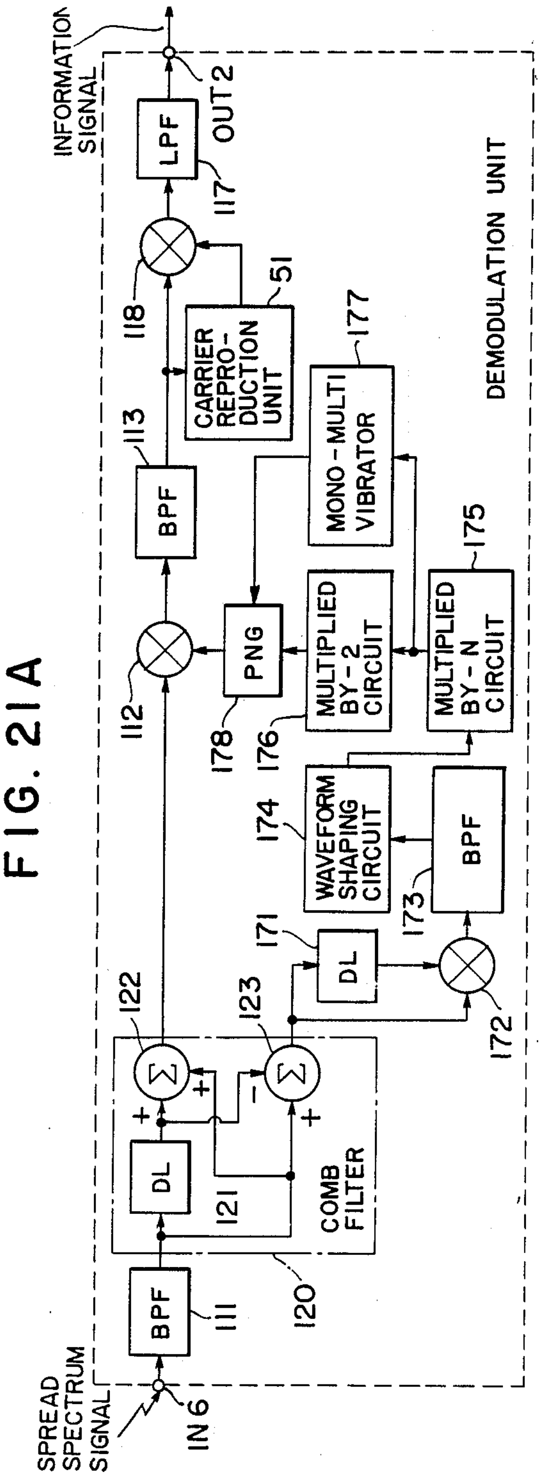

Like elements and corresponding elements to those shown in the first to sixth embodiments in the respective figures are represented using identical reference numerals in FIGS. 21A and 21B.

Referring to FIG. 21A, like elements to those shown in the previously described embodiments are indicated at 101 to 105, and 108 to 110. The characteristic circuit arrangement of the seventh embodiment includes a 1/N frequency divider 71 for frequency-dividing the clock signal by N, a mono-stable multivibrator 72 and ¼ frequency divider 73 to which the output from the 1/N frequency divider 71 is supplied, and BPF 74 for bandpassing the output from the ¼ frequency divider 73.

The modulation unit 70B shown in FIG. 21B has, as its characteristic circuit element of the seventh embodiment, a delay circuit (DL) 171 connected to the subtracter 123, a multiplier 172 for multiplying the outputs from the subtracter 123 and DL 171, BPF 173 for bandpassing the output from the multiplier 172, a waveform shaping circuit 174 for waveform-shaping the output from BPF 173, multiplied-by-N circuit 175 for multiplying the output from the waveform shaping circuit 174 by N to match the operation of the 1/N frequency divider 71, multiplied-by-2 circuit 176 and mono-stable multivibrator 177 to which the output from the multiplied-by-N circuit 175 is supplied, and a pseudo code generator (PNG) 178 to which the outputs from the multiplied-by-2 circuit 176 and the mono-multi 177 are supplied.

The function of the seventh embodiment constructed as above will be described with attention paid to the characteristic portion thereof. The operation of the modulation unit 70A and demodulation unit 70B is basically the same as that of the foregoing embodiments described with FIGS. 5, 7 and 9.

Referring to FIG. 21A, the 1/N frequency divider 71 divides the frequency of the clock signal C(t) by N, the output Dv(t) from the 1/N frequency divider 71 being supplied to the mono-multi 72 and ¼ frequency divider 73. The ¼ frequency divider further divides the frequency of the clock signal C(t) by 4. The fundamental frequency component of the signal only is passed to BPF 74 to obtain a control signal cos ωt. Namely, the frequency of the control signal cos ωt is ¼ of that of the clock signal C(t). The control signal C(t) is then supplied to the multiplier 101 whereat it is multiplied by the carrier signal cos $\omega_{c2}$t to obtain a multiplied output signal cos $\omega_{c2}$t×cos ωt having the waveform as indicated at (ii) in FIG. 9(*b*). The remaining operation on the modulation unit 70A side is the same as that previously described.

The operation on the demodulation unit 70B side will be described starting from DL 171 and the following circuit elements, which are the characteristic portions of the seventh embodiment.

The addition output signal S1(t) from the adder 122 is supplied to the multiplier 112, whereas the subtraction output signal S2(t) from the subtracter 123 is supplied to the multiplier 172. The delay circuit 171 delays the subtraction output signal S2(t) by a predetermined time τ and supplies it to the multiplier 172. The delay time τ corresponds to one frame (one quarter of the period of the control signal cos ωt) of the spread code signal P(t). Therefore, an output from the delay circuit 171 is given by:

$$S_2(t-T)=P(t-\pi/2\omega)\cos\omega_{c2}(t-\pi/2\omega)\times\cos\omega(t-\pi/2\omega) \qquad (14)$$

The delayed output signal is supplied to the multiplier 172 for multiplication by the subtraction output signal S2(t) to obtain a multiplied output signal ½×cos ω

$$t\left[\frac{1}{2}\left[\cos\left(2\omega_{c2}t-\frac{\pi\omega c2}{2\omega}\right)+\cos\omega\left(\frac{\pi\omega c2}{2\omega}\right)\right]\right],$$

with the spread code signal P(t) being transformed inot a d.c. current. The multiplied output signal is then supplied to BPF 173 to pass the control signal component cos 2 ωt which undergoes waveform shaping at the saveform shaping circuit 174 and thereafter, is supplied to the multiplied-by-2 circuit 175. The multiplied-by-2 circuit 175 delivers a multiplied-by-2 output equivalent to the frequency-divided output Dv(t) from the 1/N frequency divider 71. The multiplied-by-2 output is supplied to the multiplied-by-N circuit 176 and mono-multi 177 so that the multiplied-by-N circuit 176 reproduces a clock signal C(t) equivalent to that at the time of modulation, and the mono-multi 177 reproduces a reset signal R(t) equivalent to the output from the mono-multi 72 of the modulation unit 70A. The spread code generator 178 has the same structure as that of the spread code generator 74 on the transmission side. Therefore, upon reception of the clock signal C(t) and reset signal R(t), the spread code generator P(t) can generate a spread code signal P(t) equivalent to that at the time of modulation.

Next, the operation of generating a spread code will be described, with particular reference to the block diagram of FIG. 21B. The delay circuit 171 gives a delay time T which corresponds to one frame time of the spread code P(t). The output signal S2(t)×S2(t−T) from the multiplier 172 is given by:

$$S2(t)\times S2(t-T)=\cos 2\omega t\overline{[P(t)\cos\omega_{c2}t]^2} \quad (15)$$

The multiplier 172 outputs a signal cos 2 ωt with $\overline{[P(t)\cos\omega_{c2}t]^2}$ being removed at BPF 173 because it can be considered as a d.c. current. The output signal from the multiplier 172 is waveform shaped into a binary signal at the saveform shaping circuit 174 and thereafter, multiplied by 2 at the next multiplied-by-2 circuit 174 (multiplied signal becomes equivalent to Dv(t)). This signal is further multiplied-by-N at the multiplied-by-N circuit 176 to obtain a signal equivalent to the clock signal C(t) supplied to the input terminal IN4 on the transmission side (modulating unit 70A) and supply it to the spread code generator 178. Since the mono-multi 177 is supplied with a signal equivalent to the divided signal Dv(t) supplied to the mono-multi 72, the former operates in a similar manner to the latter. Therefore, the spread code generator 178 supplied with the output from the mono-multi 177 and with the clock signal from the multiplied-by-N 176 operates in a similar manner to that of the spread code generator 103 on the modulation unit 70A side, to obtain an equivalent spread code.

Lastly, the operation of despreading will be described in particular. The multiplier 112 is supplied with the addition output signal S1(t) from the adder 122 and with the spread code P(t) from the spread code generator 178 to multiply them together and obtain a despread output signal S1(t)×P(t) which is given by:

$$S1(t)\times P(t)=[d(t)+d(t-T)]\times\overline{[P(t)]^2}\cos\omega_{c1}t \quad (16)$$

The multiplier 112 thus demodulates a two-phase PSK signal [d(t)+d(t−T)] cos $\omega_{c1}$t with the term $\overline{[P(t)]^2}$ being removed at BPF 113 because it can be considered as a d.c. current. The carrier reproduction circuit 51 has the demodulated two-phase PSK signal input to reproduce the carrier cos $\omega_{c1}$t in accordance with the principle described with the sixth embodiment, and supply it to the multiplier 118 whereat the carrier and the demodulated two-phase PSK signal d(t) cos $\omega_{c1}$t are multiplied together for synchronous detection. After removing unnecessary frequency components at LPF 117, the information signal d(t) of good quality is demodulated and output from the output terminal OUT2.

Next, the eighth embodiment of this invention will be described with reference to FIGS. 22A, 22B and 23.

Figure 22A:
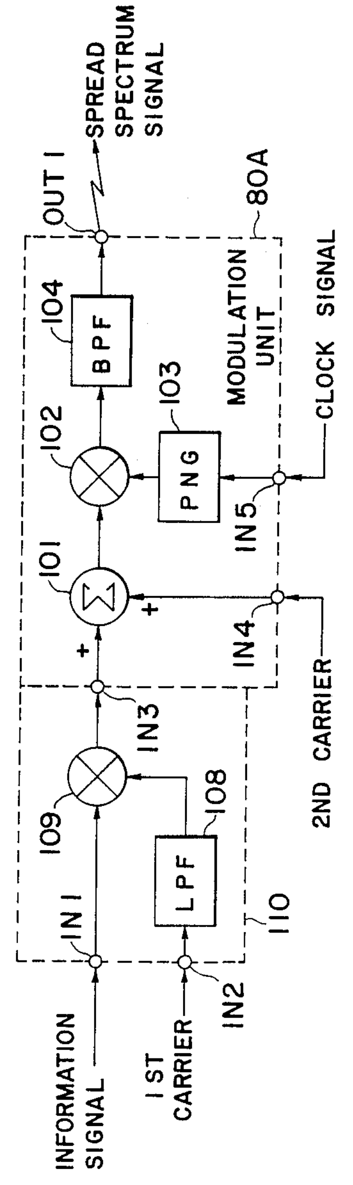
FIGS. 22A and 22B are block diagrams showing the respective modulation and demodulation units of the communication system of the eighth embodiment of the communication system of this invention.
Figure 22B:
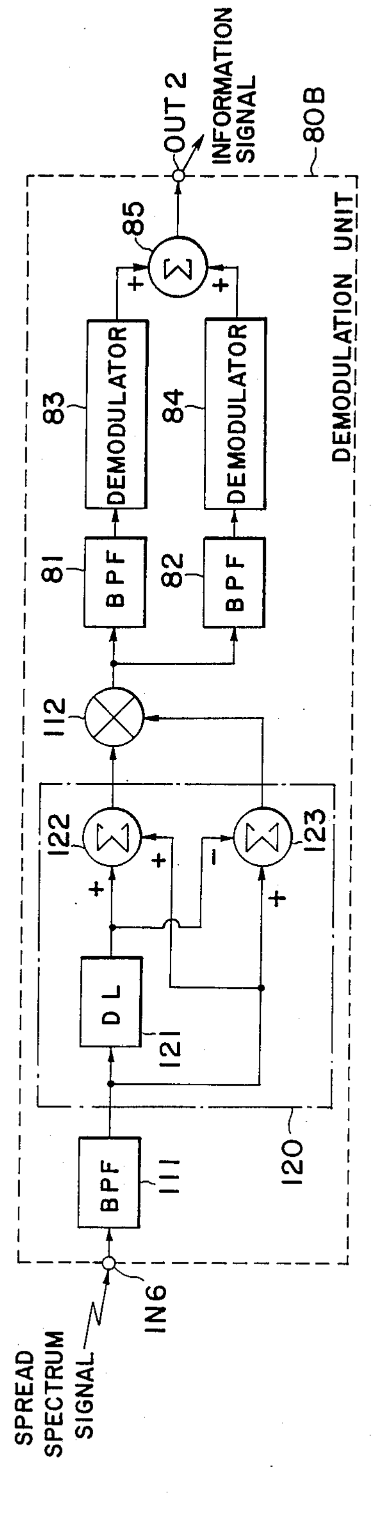

Referring to FIG. 22A, the circuit arrangement of the modulation unit 80A of the communication system of the eighth embodiment is substantially the same as that of the modulation unit 10 of the first embodiment described with FIG. 4A. An only difference is that the primary modulated signal generator 110 is included therein. The circuit 110 has the same structure as those shown in the fifth to seventh embodiments, so duplicate description is omitted.

The circuit arrangement of the demodulation unit 80B of the eighth embodiment has like elements 111, 112, and 120 to 123 to those shown, for example, in the first embodiment of FIG. 4B. The difference from the other embodiments is that there are provided BPFs 81 and 82 for receiving the output from the multiplier 112, information signal demodulating circuits (DEM) 83 and 84 connected to BPFs 81 and 82, respectively, and an adder 85 for adding together the outputs from DEMs 83 and 84.

Figure 23:
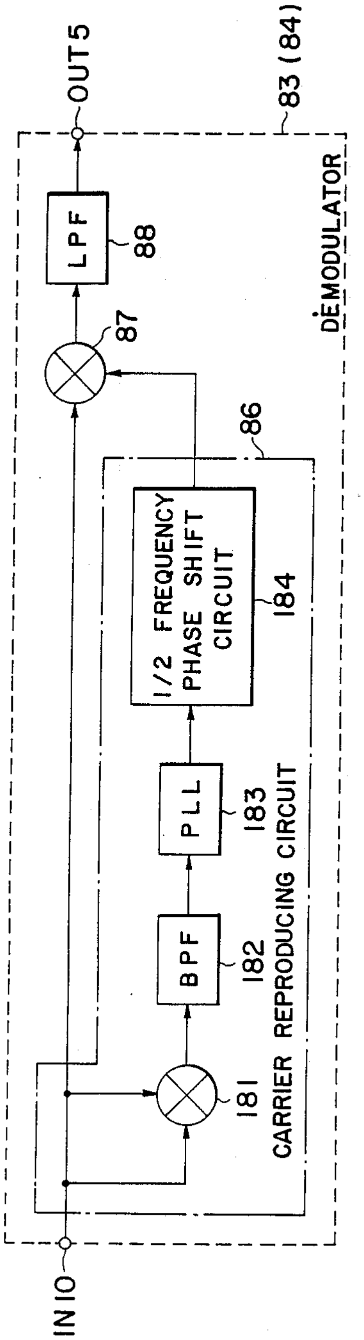
FIG. 23 is a block diagram showing details of the information signal demodulator shown in FIG. 22B.

Each of DEMs 83 and 84 has the same structure composed of a carrier reproduction circuit 86, a multiplier 87 and LPF 88, as shown in FIG. 23. The carrier reproduction circuit 86 is constructed of a multiplier 181, BPF 182, PLL 183, and ½ frequency division and phase shift circuit 184. The outputs from BPF 81 and ½ frequency division and phase shift circuit 184 are multiplied together at the multiplier 87.

The operation and function of the communication system of the eighth embodiment constructed as above will be described.

The operations of generation and output of a spread spectrum signal at the modulation unit 80A is basically the same as those of the first, and second to seventh embodiments described with FIGS. 5 to 7 and FIG. 9, respectively, so duplicate description is omitted.

The operation of the demodulation unit 80A, and the separate detection operation for the signals S1(t) and S2(t) by the comb filter 120 and the equations (3) to (6) supporting such operation, are also the same as those of the first embodiment.

The signals S1(t) and S2(t) each separately detected in accordance with the principle described with the operation of the first embodiment, are supplied to the multiplier 112 to be multiplied together for despreading. Since the spread code signal P(t) becomes a d.c. current through multiplication, demodulated two-phase PSK signals d(t) cos $(\omega_{c1}-\omega_{c2})$t and d(t) cos $(\omega_{c1}+\omega_{c2})$t equivalent to those at the time of modulating are obtained (refer to (iv) and (v) of FIG. 6(*e*)). The two two-phase PSK signals are separated at BPFs 81 and 82, respectively, and demodulated into the same information signals d(t) at DEMs 83 and 84. The information signals d(t) are added together at the adder 85 and outputted to the output terminal OUT2. The information signals d(t) from DEMs 83 and 84 contain noises. At the adder 85, the information signal level is doubled, whereas the noises are reduced by a $\sqrt{2}$ to therefore improve the S/N ratio by $\sqrt{2}$ i.e., 3 dB improvement.

Each of DEMs 83 and 84 is constructed as shown in FIG. 23. The two-phase PSK signal d(t) cos $(\omega_{c1}-\omega_{c2})$t is squared at the multiplier 181 of the carrier reproduction circuit 86. Since the two-phase PSK signal has its carrier modulated by two phases of 0 degree and 180 degrees, the carrier whose frequency is doubled at the multiplier 181 is converted into a continuous carrier having a frequency multiplied by 2. Namely, the binary signal d(t) is transformed into a d.c. current, and the carrier cos $(\omega_{c1}-\omega_{c2})$ is converted into cos $2(\omega_{c1}-\omega_{c2})$t. The output from the multiplier 181 is passed to the next stage BPF 182 to remove unnecessary frequency components and is supplied to the PLL 183 which is constructed of a multiplier (or phase comparator), LPF (or loop filter), VCO and the like. PLL 183 removes unnecessary noise componenets and obtains a carrier having a doubled frequency and a predetermined amplitude. This carrier is processed at the $\frac{1}{2}$ frequency division and phase shift circuit 184 so that the reproduced carrier cos $(\omega_{c1}-\omega_{c2})$t is output to the multiplier 87. The reproduced carrier cos $(\omega_{c1}-\omega_{c2})$t is multiplied for synchronous detection at the multiplier 87 by the two-phase PSK signal d(t) cos $(\omega_{c1}-\omega_{c2})$t supplied thereto from BPF 81. After removing unnecessary carrier components, an information signal d(t) equivalent to that on the modulating (transmission) side is obtained.

The principle supporting the above-described despreading operation is also the same as that described with the equations (7) and (8), so duplicate description is omitted.

What is claimed is:

1. A spread spectrum communication system having a modulation unit for transmitting an information signal subjected to spread spectrum modulation, and a demodulation unit for detecting the information signal subjected to the spread spectrum modulation and transmitted as a radio wave, by despreading, wherein said modulation unit comprises:

means for generating a primary modulated signal obtained by modulating a first carrier by said information signal;

means for generating a spread code signal;

spreading means for generating a first spread signal by spreading said primary modulated signal by said spread code signal;

said spreading means generating a second spread signal by spreading a second carrier inputted thereto by said spread code signal; and means for outputting said first and second spread signals and for transmitting thereof as a spread spectrum signal; and said demodulation unit comprises:

separation means for separating each other said first and second spread signals inputted thereto as the spread spectrum signal transmitted by said outputting and transmitting means; and despreading means for despreading said first and second spread signals outputted separately from said separation means, by multiplying each other to obtain a signal substantially equivalent to the primary modulated signal.

2. A spread spectrum communication system according to claim 1, wherein said modulation unit comprises means for obtaining an addition signal of said second carrier and a primary modulation signal of two-phase phase shift keying (PSK) signal which is obtained by modulating said first carrier by said information signal, and means for obtaining a spread spectrum signal by spreading said obtained addition signal with a spread code signal, and wherein said demodulation unit comprises means for receiving said spread spectrum signal and separately detecting said spread spectrum signal into a spread code signal which is said information signal multiplied by said first carrier and into a spread code signal which is said information signal multiplied by said second carrier, means for generating two two-phase PSK signals by multiplying together both said separately detected spread signals for despreading, and means for output of only one of said two two-phase PSK signals.

3. A spread spectrum communication system according to claim 2, wherein said modulation unit comprises an adder for adding said primary modulation signal and said second carrier to obtain first and second spreading signals, a pseudo noise code generator (PNG) for receiving a clock signal and generating a pseudo noise code as said spread code signal for spectrum spreading, a multiplier for generating said spread spectrum signal by spectrum spreading said first and second spreading signals with said pseudo noise code, and a band-pass filter (BPF) for band-passing said spread spectrum signal, and wherein said demodulation unit comprises a BPF for band-passing a received spread spectrum signal, a comb filter as said separation means and as said spread code reproducing means.

4. A spread spectrum communication system according to claim 1, wherein said modulation unit comprises a PNG for receiving a clock signal and generating a pseudo noise code, a first multiplier for multiplying together said primary modulation signal and the output from said PNG to generate said first spread signal, a second multiplier for multiplying together said second carrier and the output from said PNG to generate said second spread signal, an adder for adding together said first and second spread signals outputted from said first and second multipliers, and a BPF for band-passing the output from said adder, and wherein said demodulation unit comprises a first BPF for band-passing a received spectrum spread signal, a comb filter as a means for separating the output of said BPF into said first and second spread signals, a carrier reproduction circuit for reproducing said second carrier based on said second spread signal separately output from said comb filter, a first multiplier for multiplying together said second spread signal and said second carrier to reproduce said pseudo noise code, a low-pass filter (LPF) for passing only the low frequency componenet of the output from said first multiplier, a second multiplier for multiplying the output from said LPF and said first spread signal separately detected by said comb filter for despreading into said information signal, and BPF for band-passing the output from said second multiplier.

5. A spread spectrum communication system according to claim 1, wherein said modulation unit comprises means for obtaining a PSK modulated signal by PSK modulating said first carrier by said information signal, means for receiving a clock signal and obtaining a spread code signal, means for obtaining a first spread signal by multiplying said PSK modulated signal by said spread code signal for spreading, means for receiving said spread code signal and said clock signal and obtaining a finite sum conversion output signal, means for obtaining a second spread signal by multiplying said obtained finite sum conversion output signal by said second carrier, and means for output of an addition spread spectrum signal by adding together said first and second spread spectrum signals, and wherein said demodulation unit comprises means for receiving said addition spread spectrum signal and separately detecting said addition spread spectrum signal into said first and second spread signals, a delay circuit for receiving said separately detected second spread spectrum signal and giving thereto a one slot time delay, means for receiving and multiplying together an output from said delay circuit and said second spread signal to obtain a demodulated spread code signal, and means for receiving and multiplying together said obtained demodulated spread code signal and said first spread signal for despreading said first spread signal to output a demodulated PSK signal.

6. A spread spectrum communication system according to claim 5, wherein said modulation unit comprises a PNG for receiving a clock signal and generating a pseudo noise code, a first multiplier for multiplying together the output from said PNG and said first modulated signal to generate said first spread signal, a finite sum conversion circuit for receiving the output from said PNG and said clock signal to generate a finite sum conversion output, a second multiplier for multiplying together said finite sum conversion output and said second carrier to generate said second spread signal, an adder for adding together said first and second spread signals to synthesize said spectrum spread signal, and a BPF for band-passing said spread spectrum signal, and wherein said demodulation unit comprises a first BPF for band-passing a received spectrum spread signal, a comb filter for separating said band-passed spread spectrum signal into said first and second spread signals, a delay circuit for delaying said second spread signal output from said comb filter, a first multiplier for multiplying together said delayed second spread signal and said second not-delayed spread signal, a LPF for passing the low frequency component of the output from said first multiplier, a second multiplier for multiplying together the output from said LPF and said first spread signal to reproduce said information signal, and a second BPF for band-passing said information signal.

7. A spread spectrum communication system according to claim 5, wherein said modulation unit comprises a PNG for receiving said clock signal to generate a pseudo noise code, a first multiplier for multiplying together the output from said PNG and said primary modulation signal to generate said first spread signal, a first BPF for band-passing said first spread signal, a finite sum conversion circuit for receiving finite sum conversion of the output from said PNG and said clock signal, a second multiplier for multiplying together said finite sum conversion output and said second carrier to generate said second spread signal, a second BPF for band-passing said second spread signal, and an adder for adding together the outputs from said first and second BPFs to generate said spread spectrum signal, and wherein said demodulation unit comprises a first BPF for band-passing said first spread signal separated from a received spread spectrum signal, a second BPF for band-passing said separated second spread signal, a delay circuit for delaying the output from said second BPF, a first multiplier for multiplying together said second spread signal and the output from said delayed second spread signal to reproduce said pseudo noise code, a LPF for passing the low frequency component of the output from said first multiplier, a second multiplier for multiplying together the output from said LPF as the reproduced spread signal and said first spread signal, and a third BPF for band-passing the output from said second multiplier.

8. A spread spectrum communication system according to any one of claims 6 and 7, wherein said finite sum conversion circuit comprises an exclusive logical OR circuit for performing an exclusive logical OR operation between said pseudo noise code output from said PNG and the output from said finite sum conversion circuit, and a D-type flip-flop having as its D input the logical OR output and its T input said clock signal.

9. A spread spectrum communication system according to claim 1, wherein said modulation unit comprises, means for receiving and multiplying together said information signal and said first carrier to generate a two-phase PSK signal as said primary modulation signal, means for receiving said two-phase PSK signal and said second carrier to obtain an addition two-phase PSK signal, means for receiving a clock signal and generating a spread code signal on the basis of said clock signal, and means for receiving and multiplying together said addition two-phase PSK signal and said spread code signal for spreading to obtain a spread spectrum signal, and wherein said demodulation unit comprises means for receiving said spread spectrum signal and separating said spread spectrum signal into said first and second spread signals having different spectrum components corresponding to said first and second carriers, means for multiplying together said separated first and second spread signals to obtain a multiplication output signal, means for separating said obtained multiplication output signal into two signals corresponding to said difference frequency between and said sum frequency of said first and second carriers and multiplying together said two signals to obtain two squared output signals corresponding to said frequencies two times as high as that of said first and second carriers, means for separating said two squared output signals and frequency-dividing said two separated squared output signals to obtain first and second reproduced carriers, means for receiving and multiplying together said second reproduced carrier and said second spread signal to generate a reproduced spread code signal, means for receiving and multiplying together said reproduced spread code signal and said first reproduced carrier to generate a despreading signal, and means for receiving and multiplying together said despreading signal and said first spread signal for despreading to demodulate said primary demodulated signal and output said information signal.

10. A spread spectrum communication system according to claim 9, wherein said modulation unit comprises a primary modulation signal generating circuit having a LPF for passing the low frequency component of said information signal and a first multiplier for multiplying together the output from said LPF and said first carrier, an adder for adding together said primary modulated signal and said second carrier to generate a spreading signal containing first and second signal components of said first and second spread signals, a PNG for receiving said clock signal and generating said pseudo noise code, a second multiplier for multiplying together said spreading signal and said pseudo noise code to generate said second spread signal, and a BPF for band-passing the output from said second multiplier, and wherein said demodulation unit comprises a BPF for band-passing a received spectrum spread signal, a comb filter as said separation means for separating said spread spectrum signal into said first and second spread signals, a code reproduction circuit for reproducing said pseudo noise code for despreading based on said separated first and second spread signals, a multiplier for multiplying together said first spread signal and said reproduced code to despread said primary modulated signal, and a LPF for passing the low frequency component of said primary modulated signal to pick up said information signal.

11. A spread spectrum communication system according to claim 10, wherein said code reproduction circuit of said demodulation unit comprises a first multiplier for multiplying together said first and second spread signals separated by said comb filter, first and second BPFs for band-passing the output from said first multiplier at different specific frequency bands to separate the output from said first multiplier, a second multiplier for multiplying together the outputs from said first and second BPFs, third and fourth BPFs for band-passing the output from said second multiplier at different specific frequency band to separate the output from said second multiplier, first and second ½ frequency dividers for frequency-dividing the outputs from said third and fourth BPFs by 2, a third multiplier for multiplying together said second spread signal outputted from said comb filter and the output from said second ½ frequency divider, a LPF for passing the low frequency componenet of the output from said third multiplier, and a fourth multiplier for multiplying together the output from said LPF and the output from said first ½ frequency divider to reproduce said code.

12. A spread spectrum communication system according to claim 1, wherein said modulation unit comprises means for receiving and multiplying together said information signal and said first carrier to generate a first two-phase PSK signal, means for receiving said information signal and said second carrier to obtain a second PSK signal, means for receiving a clock signal and generating a spread code signal on the basis of said clock signal, means for receiving and multiplying together said first two-hase PSK signal and said spread code signal for spreading to obtain said first spread signal, means for receiving and multiplying together said second two-phase PSK signal and said spread code signal for spreading to obtain said second spared signal, means for generating a control signal in synchronization with said spread code signal based on said clock signal, means for receiving and multiplying together said control signal and said second spread signal to obtain a multiplication output signal, and means for adding said multiplication output signal and said first spread signal to generate and output said spread spectrum signal, and wherein said demodulation unit comprises means for receiving said spread spectrum signal and separating said spread spectrum signal into said first spread spectrum signal and said multiplication output signal having different spectrum componenets corresponding to said first and second carriers, means for receiving and processing said separated first spread signal and multiplication output signal to derive therefrom a control signal, means for reproducing a clock signal and a reset signal on the basis of said control signal and generating a spread code signal in synchronization with said spread code signal at said modulation side, means for receiving and multiplying together said reproduced spread code signal and said separately detected first spread signal for despreading to obtain a demodulated two-phase PSK signal, and means for demodulation and output of an information signal equivalent to said information signal at said time of modulating through synchronous detection of said demodulated two-phase PSK signal.

13. A spread spectrum communication system according to claim 12, wherein said modulation unit comprises a LPF for passing the low frequency component of said information signal, a primary modulation signal generating circuit having a multiplier for multiplying together the output from said LPF and said first carrier, a first multiplier for multiplying together said low frequency passed information signal and said second carrier to output a second primary modulated signal, a frequency divider for receiving a clock signal and frequency-dividing said clock signal by a constant N so as to allow resetting within the period of an M sequence code, a monostable multivibrator operating in response to the output from said frequency divider, a PNG for generating a pseudo noise code on the basis of the output from said multivibrator and said clock signal, a second multiplier for multiplying together said first primary modulation signal supplied from said primary modulation signal generation circuit and said pseudo noise code from said PNG to generate said first spread signal, a third multiplier for multiplying together said second primary modulated signal and said pseudo noise code to generate said second spread signal, a fourth multiplier for controlling said second spread signal based on the output from said frequency divider, an adder for adding together said first and second spread signals outputted from said second and fourth multipliers, and a BPF for band-passing the output from said adder, and wherein said demodulation unit comprises a first BPF for band-passing a received spread spectrum signal, a comb filter as said separation means for separating said band-passed spread spectrum signal, a coded signal reproduction circuit for reproducing said code by receiving said first and second spread signals outputted from said comb filter and detecting a control signal which is multiplied by said constant N, a first multiplier for multiplying said reproduced coded signal and said first spread signal for despreading, a second BPF for band-passing the output from said first multiplier, a carrier reproduction unit for reproducing a first carrier on the basis of a signal equivalent to said despread first primary modulated signal, a second multiplier for multiplying said first primary modulated signal and said first carrier for despreading and reproducing said information signal, and a LPF for passing the low frequency component of the output from said second multiplier.

14. A spread spectrum communication system according to claim 13, wherein said coded signal reproduction circuit comprises a control signal detection unit for detecting a control signal based on said first and second spread signals separated by said comb filter, a multiplied-by-N circuit for multiplying said detected control signal by said constant N, a mono-stable multivibrator for output of a mono-stable output in response to said control signal, and a PNG for reproducing said pseudo noise code on the basis of the output from said multiplied-by-N circuit and mono-stable multivibrator.

15. A spread spectrum communication system according to claim 14, wherein said control signal detection unit comprises a first carrier reproduction unit for reproducing said first carrier based on said first spread signal separately detected by said comb filter, a first multiplier for multiplying together said first spread signal and said first carrier to generate first control signal, a first LPF for passing the low frequency componenet of the output from said first multiplier, a second carrier reproduction unit for reproducing said second carrier based on said second spread signal from said comb filter, a second multiplier for multiplying together said second spread signal and said second carrier to generate a second control signal, a second LPF for passing the low frequency componenet of the output from said second multiplier, a third multiplier for multiplying together said first and second control signals output from said first and second LPFs to generate a control signal, a BPF for band-passing the output from said third multiplier, and a phase locked loop (PLL) for synchronization of the phase of the output from said BPF.

16. A spread spectrum communication system according to claim 1, wherein said modulation unit comprises means for receiving and multiplying together said information signal and said first carrier to generate a two-phase PSK signal, means for receiving a clock signal and generating a spread code signal on the basis of said clock signal, means for receiving and frequency-dividing said clock signal to generate a control signal which is in synchronization with said spread code signal, means for receiving and multiplying together said control signals and said second carrier to obtain a modulated signal, and means for multiplying together an addition signal obtained through addition of said modulated signal and said two-phase PSK signal for spreading to generate and output said spread spectrum signal, and wherein said demodulation unit comprises means for receiving said spread spectrum signal and separating said spread spectrum signal into a signal component which is a multiplication of said two-phase PSK signal and said spread code signal and a signal component which is a multiplication of said modulated signal and said spread code signal, means for receiving and processing said separated signal component which is said multiplication of said modulated signal and said spread code signal to separate and reproduce said control signal, means for reproducing said clock signal on the basis of said reproduced control signal to generate a spread code signal in synchro with said spread code signal at said modulating side, means for receiving and multiplying together said reproduced spread code signal and said separated signal component which is said multiplication of said two-phase PSK signal and said spread code signal for despreading to obtain a demodulated two-phase PSK signal, and means for demodulation and output of an information signal equivalent to said information signal at said time of modulating through synchronous detection of said demodulated two-phase PSK signal.

17. A spread spectrum communication system according to claim 16, wherein said modulation unit comprises a primary modulation signal generating circuit for output of a first primary modulation signal, said primary modulated signal generating circuit having a LPF for passing the low frequency component of said first carrier and a multiplier for multiplying together the output from said LPF and said information signal, a 1/N frequency divider for frequency-dividing an inputted clock signal by a constant N, a mono-stable multivibrator for outputting a control signal with predetermined timing intervals in response to said 1/N frequency divider output, a PNG for generating a pseudo noise code as said spread code signal based on the output from said mono-stable multivibrator, a first multiplier for multiplying together said pseudo noise code output from said PNG and said second carrier to generate a second primary modulated signal, an adder for adding together said first and second primary modulated signals to generate said spread spectrum signal containing said first and second spread signal, a $\frac{1}{4}$ frequency divider for frequency-dividing the output from said 1/N frequency divider by 4, a first BPF for band-passing the output from said $\frac{1}{4}$ frequency divider, a second multiplier for multiplying together said spread spectrum signal and the output from said first BPF, and a second BPF for band-passing the output from said second multiplier, and wherein said demodulation unit comprises a BPF for band-passing a received spread spectrum signal, a comb filter as said separation means for separating said band-passed spread spectrum signal into said first and second spread signals, a delay circuit for delaying said second spread signal output from said comb filter, a first multiplier for multiplying together said delayed second spread signal and said second non-delayed spread signal, a BPF for band-passing the output from said first multiplier, a waveform shaping circuit for waveform-shaping the output from said BPF, a multiplied-by-N circuit for multiplying the output from the waveform shaping circuit by said constant N, a multiplied-by-2 circuit for multiplying the output from said multiplied-by-N circuit by 2, a mono-stable multivibrator for making the output from said multiplied-by-N circuit to have constant timing intervals, a PNG for reproducing said pseudo noise code on the basis of output from said multiplied-by-2 circuit and said mono-stable multivibrator, a second multiplier for multiplying together said pseudo noise code from said PNG and said first spread signal from said comb filter for despreading, a second BPF for band-passing the output from said second multiplier, a carrier reproduction unit for reproducing said first carrier on the basis of the output from said BPF, a third multiplier for multiplying together said reproduced carrier and the output from said second BPF to reproduce said information signal, and a LPF for passing the low frequency component of the output from said third multiplier.

18. A spread spectrum communication system according to claim 1, wherein said modulation unit comprises means for obtaining a primary modulation signal by PSK modulating said first carrier by said information signal, means for receiving said second carrier whose frequency is different from said frequency of said first carrier to obtain an addition signal of said first carrier and said second carrier, and means for spread modulating said addition signal with a spread code signal to obtain a composite spread spectrum signal, and said demodulation unit comprises means for receiving said composite spread spectrum signal and separately detecting said composite spread spectrum signal into a first spread spectrum signal with said spread primary modulated signal and a second spread spectrum signal with said spread second carrier, means for multiplying together said separately detected signals for despreading, means for demodulating information signals on the basis said two PSK signals obtained through despreading, and means for adding together said demodulated two information signals and outputting the addition result.

19. A spread spectrum communication system according to claim 18, wherein said modulation unit comprises a primary modulation signal generating circuit for generating said primary modulated signal, said primary modulation signal generating circuit having a LPF for passing the low frequency component of said first carrier and a multiplier for multiplying the output from said LPF and said information signal, an adder for adding together said primary modulation signal and said second carrier, a PNG for receiving a clock signal and generating a pseudo noise code as said spectrum spreading code, a first multiplier for multiplying together the outputs from said PNG and said adder to generate said spread spectrum signal containing first and second spread signal components, and a BPF for band-passing the output from said first multiplier, and wherein said demodulation unit comprises a first BPF for band-passing a received spread spectrum signal, a comb filter as said separation means for separating the output from said first BPF into said first and second spread signal components, a first multiplier for multiplying together said first and second spread signals output from said comb filter for despreading to reproduce two d.c. demodulated two-phase PSK signals, second and third BPFs for band-passing the outputs from said two signals from said first multiplier, first and second information signal demodulating circuits (DEM) for demodulating the same information signal containing a noise component from the outputs from said second and third BPFs, and an adder for adding together the outputs from said first and second DEM to remove said noise component.

20. A spread spectrum communication system according to claim 19, wherein said DEM comprises a carrier reproduction unit for reproducing said first or second carrier based on a signal equivalent to said primary modulation signal containing the information signal componenet and said first and second carrier component, a multiplier for multiplying together said equivalent signal and said first or second carrier to demodulate said information signal, and a LPF for passing the low frequency component of the output from said multiplier.

21. A spread spectrum communication system according to any one of claims 4, 13, 15, 17 and 20, wherein said carrier reproduction unit comprises a multiplier for squaring a signal inputted thereto, a BPF for band-passing the output from said multiplier, a phase locked loop (PLL) for synchronizing the phase of the output from said BPF, and a 1.2 frequency divider for frequency-dividing the output from said PLL.

22. A spread spectrum communication system according to claim 21, wherein said PLL comprises a multiplier for multiplying together the outputs from said BPF and said PLL, a LPF for passing the low frequency component of the output from said multiplier, and a voltage controlled oscillator (VCO) for controlling the voltage of the output from said LPF.

23. A spread spectrum communication system according to any one of claims 3, 4, 6, 10, 13, 14, 15, 17 and 19, wherein said comb filter comprises a delay circuit (DL) for delaying a received spread spectrum signal by a predetermined time, an adder for adding together the output from said DL and said spread spectrum signal to generate and output said first spread signal component, and a subtracter for subtracting the output from said DL from said spread spectrum signal to generate and output said second spread signal component.

* * * * *